United States Patent
Fields et al.

(10) Patent No.: US 10,373,523 B1
(45) Date of Patent: Aug. 6, 2019

(54) DRIVER ORGANIZATION AND MANAGEMENT FOR DRIVER'S EDUCATION

(71) Applicant: STATE FARM MUTUAL AUTOMOBILE INSURANCE COMPANY, Bloomington, IL (US)

(72) Inventors: Brian Mark Fields, Normal, IL (US); Steve Roberson, Normal, IL (US); Abhishek Harish, Champaign, IL (US); Hyunji Lim, Champaign, IL (US); Matthew James Waughtel, Cuba, IL (US); Bryan Allen Plummer, Urbana, IL (US); Parker Andrew Brown, Mundelein, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/699,758

(22) Filed: Apr. 29, 2015

(51) Int. Cl.
*G09B 19/16* (2006.01)
*G09B 19/14* (2006.01)
(Continued)

(52) U.S. Cl.
CPC .......... *G09B 19/16* (2013.01); *G06F 3/0482* (2013.01); *G06F 3/04842* (2013.01); *G09B 19/14* (2013.01)

(58) Field of Classification Search
CPC ........ G09B 19/14; G09B 19/167; G09B 5/12; G09B 5/00; G09B 19/16; G07C 5/008; G06Q 10/0639; G06Q 10/0833; G06Q 40/04; G06Q 40/08; G06Q 10/06; B60W 2050/0064; B60W 2050/0089;
(Continued)

(56) References Cited

U.S. PATENT DOCUMENTS 6,154,750 A * 11/2000 Roberge ................ G06F 3/0482
6,636,790 B1 10/2003 Lightner et al.
(Continued)

OTHER PUBLICATIONS

Final Office Action, U.S. Appl. No. 14/703,482, dated Dec. 9, 2015.
(Continued)

*Primary Examiner* — Eddy Saint-Vil
(74) *Attorney, Agent, or Firm* — Marshall, Gerstein & Borun LLP; Randall G. Rueth

(57) ABSTRACT

During driving sessions, data may be collected via one or more sensors that are incorporated within a vehicle or as part of a device carried within the vehicle. Using this data, a driving session report may be generated and a driving session feedback score may be calculated, which provides feedback regarding a students' driving skills Driver profiles may be generated for each student including contact information and/or any number of driving session reports saved over the course of several driving sessions. A user interface is described that facilitates interaction by allowing a user to create driver profiles, group driver profiles, display driver profiles as a single list view or as a grouped list view, select driver profiles from these displayed lists, edit driver information and/or delete driver profiles, and display driving session reports stored as part of a driver profile together such that comparisons may be made.

21 Claims, 8 Drawing Sheets

(51) Int. Cl.
*G06F 3/0482* (2013.01)
*G06F 3/0484* (2013.01)

(58) Field of Classification Search
CPC ........ B60W 40/09; G08G 1/00; G06F 3/0482; G06F 3/0484
USPC ....... 434/65, 69, 350; 705/4, 7.38; 701/29.3, 701/32.4
See application file for complete search history.

(56) References Cited

U.S. PATENT DOCUMENTS

| | | |
|---|---|---|
| 7,155,321 B2 | 12/2006 | Bromley et al. |
| 7,835,691 B2 | 11/2010 | Groskreutz et al. |
| 7,937,278 B1 | 5/2011 | Cripe et al. |
| 8,140,358 B1 | 3/2012 | Ling et al. |
| 8,306,731 B2 | 11/2012 | Waggaman, III |
| 8,463,488 B1 | 6/2013 | Hart |
| 8,554,468 B1 | 10/2013 | Bullock |
| 8,626,568 B2 | 1/2014 | Warkentin et al. |
| 8,731,768 B2 | 5/2014 | Fernandes et al. |
| 8,876,535 B2 | 11/2014 | Fields et al. |
| 8,954,340 B2 | 2/2015 | Sanchez et al. |
| 8,977,033 B1 | 3/2015 | Maurer et al. |
| 9,056,616 B1 | 6/2015 | Fields et al. |
| 9,180,888 B1 | 11/2015 | Fields et al. |
| 9,198,206 B2 | 11/2015 | Li et al. |
| 9,279,697 B1 | 3/2016 | Fields et al. |
| 2002/0181405 A1 | 12/2002 | Ying |
| 2003/0083079 A1 | 5/2003 | Clark et al. |
| 2003/0163587 A1 | 8/2003 | Knight et al. |
| 2003/0195676 A1 | 10/2003 | Kelly et al. |
| 2003/0228005 A1 | 12/2003 | Melick et al. |
| 2004/0054452 A1 | 3/2004 | Bjorkman |
| 2004/0117740 A1* | 6/2004 | Chen ............................ 715/210 |
| 2004/0157650 A1 | 8/2004 | Wissinger et al. |
| 2004/0158476 A1 | 8/2004 | Blessinger et al. |
| 2004/0176935 A1 | 9/2004 | Sproule et al. |
| 2004/0236474 A1 | 11/2004 | Chowdhary et al. |
| 2004/0254698 A1 | 12/2004 | Hubbard et al. |
| 2005/0038581 A1 | 2/2005 | Kapolka et al. |
| 2005/0065678 A1 | 3/2005 | Smith et al. |
| 2005/0065679 A1 | 3/2005 | Kawauchi et al. |
| 2005/0091018 A1 | 4/2005 | Craft |
| 2005/0154500 A1 | 7/2005 | Sonnenrein et al. |
| 2005/0165639 A1 | 7/2005 | Ross et al. |
| 2005/0203673 A1 | 9/2005 | El-Hajj et al. |
| 2006/0022842 A1 | 2/2006 | Zoladek et al. |
| 2006/0109113 A1 | 5/2006 | Reyes et al. |
| 2006/0247832 A1 | 11/2006 | Taki |
| 2007/0035632 A1 | 2/2007 | Silvernail et al. |
| 2007/0038338 A1 | 2/2007 | Larschan et al. |
| 2007/0038351 A1 | 2/2007 | Larschan et al. |
| 2007/0038352 A1 | 2/2007 | Larschan et al. |
| 2007/0038353 A1 | 2/2007 | Larschan et al. |
| 2007/0050108 A1 | 3/2007 | Larschan et al. |
| 2007/0122771 A1 | 5/2007 | Maeda et al. |
| 2007/0257815 A1 | 11/2007 | Gunderson et al. |
| 2008/0015748 A1 | 1/2008 | Nagy |
| 2008/0046506 A1* | 2/2008 | Broda ............... G06F 17/30592 709/203 |
| 2008/0064014 A1 | 3/2008 | Wojtczak et al. |
| 2008/0082372 A1 | 4/2008 | Burch |
| 2008/0243558 A1 | 10/2008 | Gupte |
| 2008/0255722 A1 | 10/2008 | McClellan et al. |
| 2009/0069954 A1 | 3/2009 | Aladesuyi |
| 2009/0079555 A1 | 3/2009 | Aguirre De Carcer et al. |
| 2009/0135845 A1 | 5/2009 | Husain et al. |
| 2009/0318783 A1* | 12/2009 | Rohde .................. A61B 5/073 600/302 |
| 2010/0045452 A1 | 2/2010 | Periwal |
| 2010/0097208 A1 | 4/2010 | Rosing et al. |
| 2010/0174576 A1 | 7/2010 | Naylor |
| 2010/0191411 A1 | 7/2010 | Cook et al. |
| 2010/0210254 A1 | 8/2010 | Kelly et al. |
| 2010/0253508 A1 | 10/2010 | Koen et al. |
| 2010/0256861 A1 | 10/2010 | Hodges |
| 2010/0256864 A1 | 10/2010 | Ying |
| 2011/0009107 A1 | 1/2011 | Guba et al. |
| 2011/0043377 A1 | 2/2011 | McGrath et al. |
| 2011/0125363 A1 | 5/2011 | Blumer et al. |
| 2011/0213628 A1 | 9/2011 | Peak et al. |
| 2011/0251752 A1 | 10/2011 | DeLarocheliere et al. |
| 2011/0254655 A1 | 10/2011 | Maalouf et al. |
| 2011/0276218 A1 | 11/2011 | Dwan et al. |
| 2011/0289397 A1* | 11/2011 | Eastmond ............ G06F 3/0485 715/212 |
| 2011/0294466 A1 | 12/2011 | Tang et al. |
| 2011/0307188 A1 | 12/2011 | Peng et al. |
| 2012/0021386 A1 | 1/2012 | Anderson et al. |
| 2012/0041638 A1 | 2/2012 | Johnson et al. |
| 2012/0044052 A1 | 2/2012 | Davis et al. |
| 2012/0046807 A1 | 2/2012 | Ruther et al. |
| 2012/0046825 A1 | 2/2012 | Ruther et al. |
| 2012/0047291 A1 | 2/2012 | Davis et al. |
| 2012/0135382 A1 | 5/2012 | Winston et al. |
| 2012/0215375 A1 | 8/2012 | Chang |
| 2012/0239223 A1 | 9/2012 | Schwarz et al. |
| 2012/0253888 A1* | 10/2012 | Davidson ...................... 705/7.38 |
| 2012/0303392 A1 | 11/2012 | Depura et al. |
| 2012/0313771 A1 | 12/2012 | Wittliff, III |
| 2013/0006675 A1 | 1/2013 | Bowne et al. |
| 2013/0096731 A1 | 4/2013 | Tamari et al. |
| 2013/0097176 A1 | 4/2013 | Khader et al. |
| 2013/0164715 A1 | 6/2013 | Hunt et al. |
| 2013/0179198 A1* | 7/2013 | Bowne et al. ..................... 705/4 |
| 2013/0184928 A1 | 7/2013 | Kerkhof et al. |
| 2013/0189649 A1 | 7/2013 | Mannino |
| 2013/0209968 A1 | 8/2013 | Miller et al. |
| 2013/0282227 A1 | 10/2013 | Chen et al. |
| 2013/0282228 A1 | 10/2013 | Cawse et al. |
| 2013/0289873 A1 | 10/2013 | Mitchell |
| 2013/0309648 A1* | 11/2013 | Park ........................ G09B 5/00 434/350 |
| 2014/0026660 A1 | 1/2014 | Zhang et al. |
| 2014/0045147 A1* | 2/2014 | Mohn ..................... G08G 1/00 434/69 |
| 2014/0058616 A1* | 2/2014 | de Oliveira ............ G06Q 10/06 701/29.3 |
| 2014/0058618 A1 | 2/2014 | Rude et al. |
| 2014/0080098 A1 | 3/2014 | Price |
| 2014/0080100 A1 | 3/2014 | Phelan et al. |
| 2014/0162219 A1 | 6/2014 | Stankoulov |
| 2014/0163848 A1 | 6/2014 | Tamir et al. |
| 2014/0168399 A1 | 6/2014 | Plummer et al. |
| 2014/0189814 A1 | 7/2014 | Marten et al. |
| 2014/0195102 A1 | 7/2014 | Nathanson |
| 2014/0195272 A1 | 7/2014 | Sadiq et al. |
| 2014/0204193 A1 | 7/2014 | Zhang et al. |
| 2014/0257870 A1 | 9/2014 | Cielocha et al. |
| 2014/0266660 A1 | 9/2014 | Slaton et al. |
| 2014/0272810 A1 | 9/2014 | Fields et al. |
| 2015/0081162 A1* | 3/2015 | Mitchell ............... B60W 40/09 701/32.4 |
| 2015/0086953 A1* | 3/2015 | Johansson ................ G09B 5/12 434/247 |

OTHER PUBLICATIONS

Non-Final Office Action, U.S. Appl. No. 14/494,251, dated Nov. 13, 2015.
Notice of Allowance, U.S. Appl. No. 14/494,088, dated Mar. 30, 2015.
Final Office Action, U.S. Appl. No. 14/699,758, dated Feb. 2, 2016.
Nonfinal Office Action, U.S. Appl. No. 14/875,826, dated Nov. 6, 2015.
Notice of Allowance, U.S. Appl. No. 14/703,482, dated Jul. 1, 2016.
Notice of Allowance, U.S. Appl. No. 14/494,251, dated Apr. 18, 2016.
Notice of Allowance, U.S. Appl. No. 14/702,277, dated Aug. 18, 2015.
Notice of Allowance, U.S. Appl. No. 14/875,826, dated Jan. 7, 2016.

(56) References Cited

OTHER PUBLICATIONS

U.S. Appl. No. 15/010,074, filed Jan. 29, 2016.
U.S. Appl. No. 15/152,790, filed May 12, 2016.
U.S. Appl. No. 15/410,445, filed Jan. 19, 2017.
U.S. Appl. No. 15/902,357, filed Feb. 22, 2018.
Nonfinal Office Action, U.S. Appl. No. 15/010,074, dated Jan. 13, 2017.
Final Office Action, U.S. Appl. No. 15/010,074, dated Jun. 8, 2017.
U.S. Appl. No. 15/812,233, filed Nov. 14, 2017.
Nonfinal Office Action, U.S. Appl. No. 15/812,233, dated Jan. 25, 2018.
Final Office Action, U.S. Appl. No. 14/494,251, dated May 12, 2015.
Non-Final Office Action, U.S. Appl. No. 14/494,088, dated Dec. 15, 2014.
Non-Final Office Action, U.S. Appl. No. 14/494,251, dated Dec. 5, 2014.
Non-Final Office Action, U.S. Appl. No. 14/702,277, dated May 26, 2015.
Non-Final Office Action, U.S. Appl. No. 14/703,482, dated Jul. 1, 2015.
U.S. Appl. No. 14/494,251, filed Sep. 23, 2014.
U.S. Appl. No. 14/703,482, filed May 4, 2015.
U.S. Appl. No. 14/702,277, filed May 1, 2015.

* cited by examiner

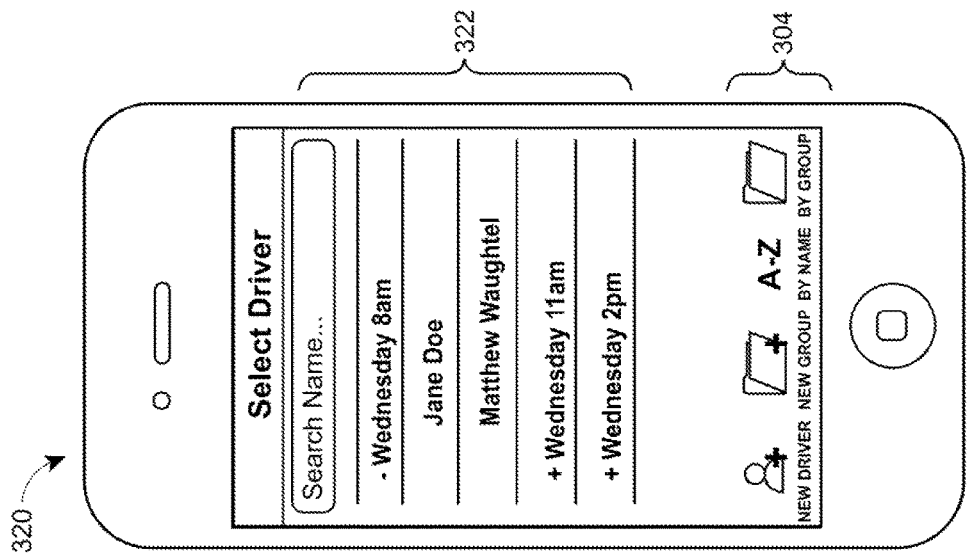
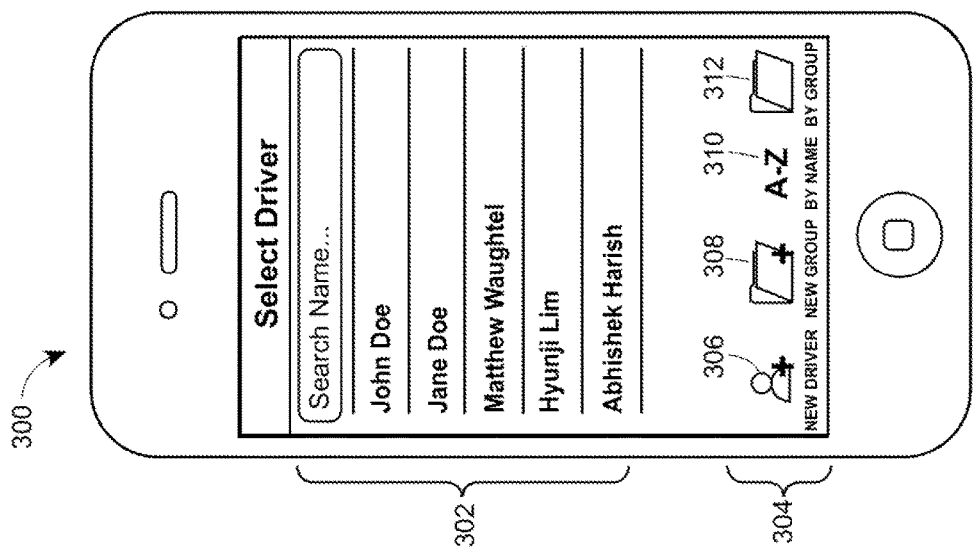
FIG. 3A
FIG. 3B

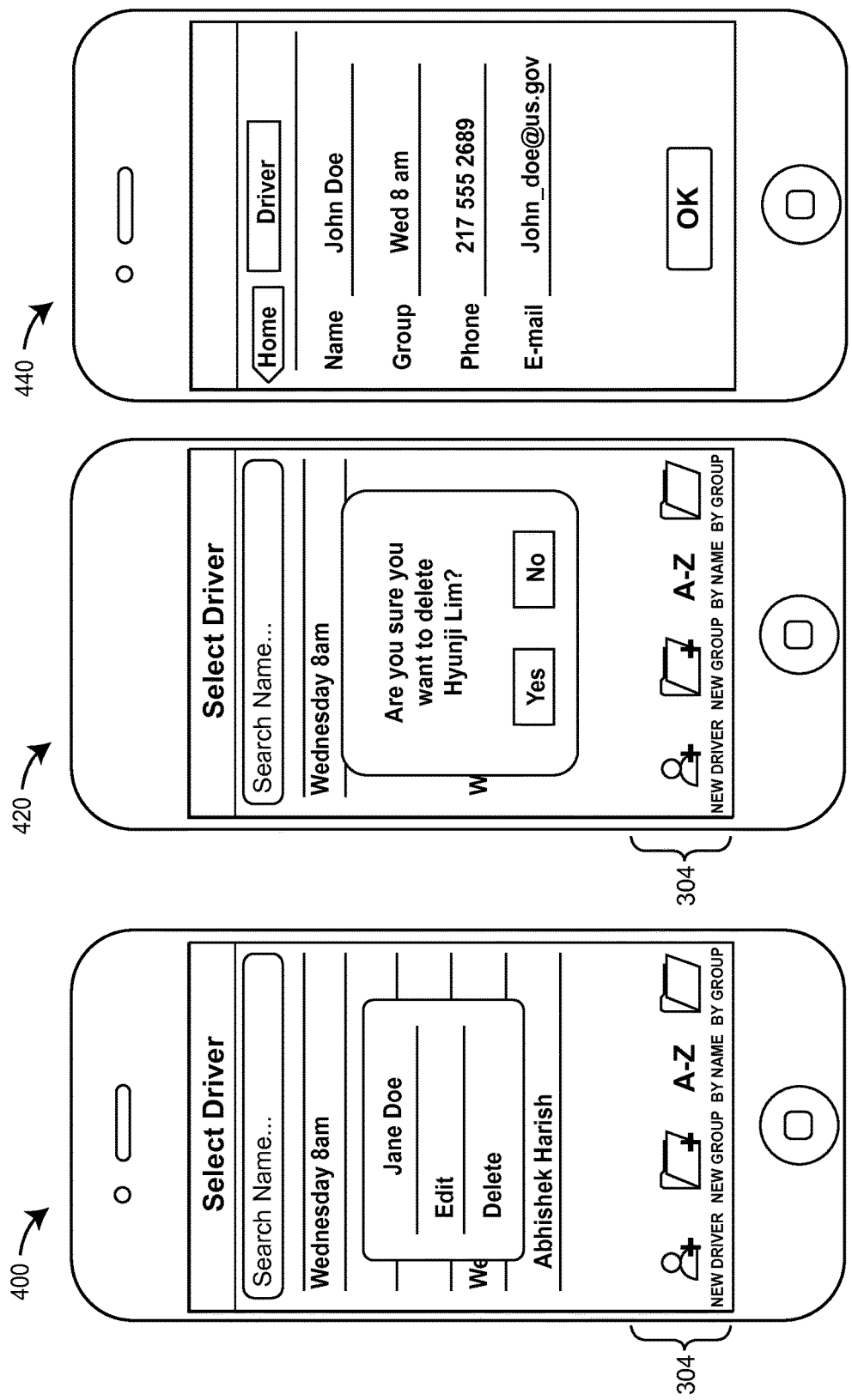

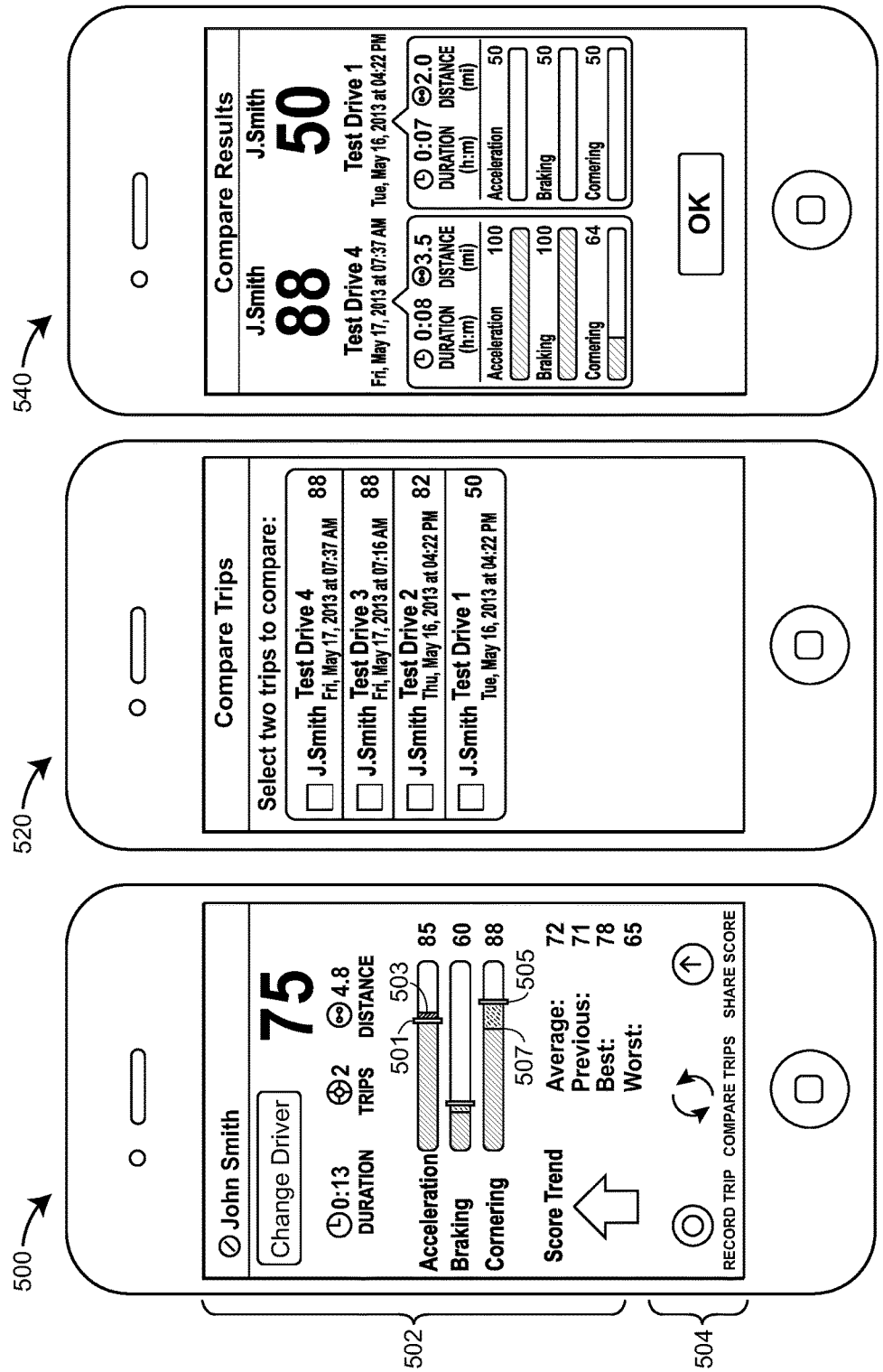

DRIVER ORGANIZATION AND MANAGEMENT FOR DRIVER'S EDUCATION

TECHNICAL FIELD

The present disclosure relates to systems, methods, apparatus, and non-transitory computer readable media for providing driving session feedback data, and, more particularly, to using one or more devices to allow an instructor to organize, view, and compare driving session feedback data for several students.

BACKGROUND

Traditionally, a student driver may take driving classes and/or participate in various driving sessions whereby the student is evaluated on his driving performance. During a typical driving session, a student driver may be requested to drive along a certain route while the student's driving skills are observed and evaluated by an instructor. Based on the instructor's observations, the student driver is graded according to a set of criteria. An instructor may measure a student's progress by comparing notes of observations over the course of several driving sessions, noting particular skills a student has had trouble with and focusing more on those skills in subsequent driving sessions.

An instructor may teach one or more classes of several students. As a result, an instructor may need to expend a great deal of effort creating, organizing, maintaining, and retrieving notes from previous driving sessions for each student. Furthermore, a comparison of driving sessions for each student may require the instructor to manually search through previous records of driving sessions each time a student is tested, which may be an arduous and time-consuming process. Therefore, providing a system that allows an instructor to maintain and organize driving session records for a large number of students while providing access to these records is useful but presents several challenges.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 3A illustrates an exemplary screen 300 for a device displaying a student roster screen in accordance with an exemplary aspect of the present disclosure;

FIG. 3B illustrates an exemplary screen 320 for a device displaying a group roster screen in accordance with an exemplary aspect of the present disclosure;

FIG. 4A illustrates an exemplary screen 400 for a device facilitating modifications to the student roster in accordance with an exemplary aspect of the present disclosure;

FIG. 4B illustrates an exemplary screen 420 for a device facilitating edits to the student roster upon selection of the edit portion of screen 400 in accordance with an exemplary aspect of the present disclosure;

FIG. 4C illustrates an exemplary screen 440 for a device facilitating deletions to the student roster upon selection of the delete portion of screen 400 in accordance with an exemplary aspect of the present disclosure;

FIG. 5A illustrates an exemplary screen 500 for a device displaying a driving session report for a driver selected from the student roster or the group roster as shown in FIGS. 3A and 3B, respectively;

FIG. 5B illustrates an exemplary screen 520 for a device facilitating the selection of two or more driving session reports for comparison corresponding to the driver as shown in FIG. 5A;

FIG. 5C illustrates an exemplary screen 540 for a device displaying two driving session reports corresponding to the selected driving session reports as shown in FIG. 5B;

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

I. Data Collection During Student Driver Testing

Figure 1:
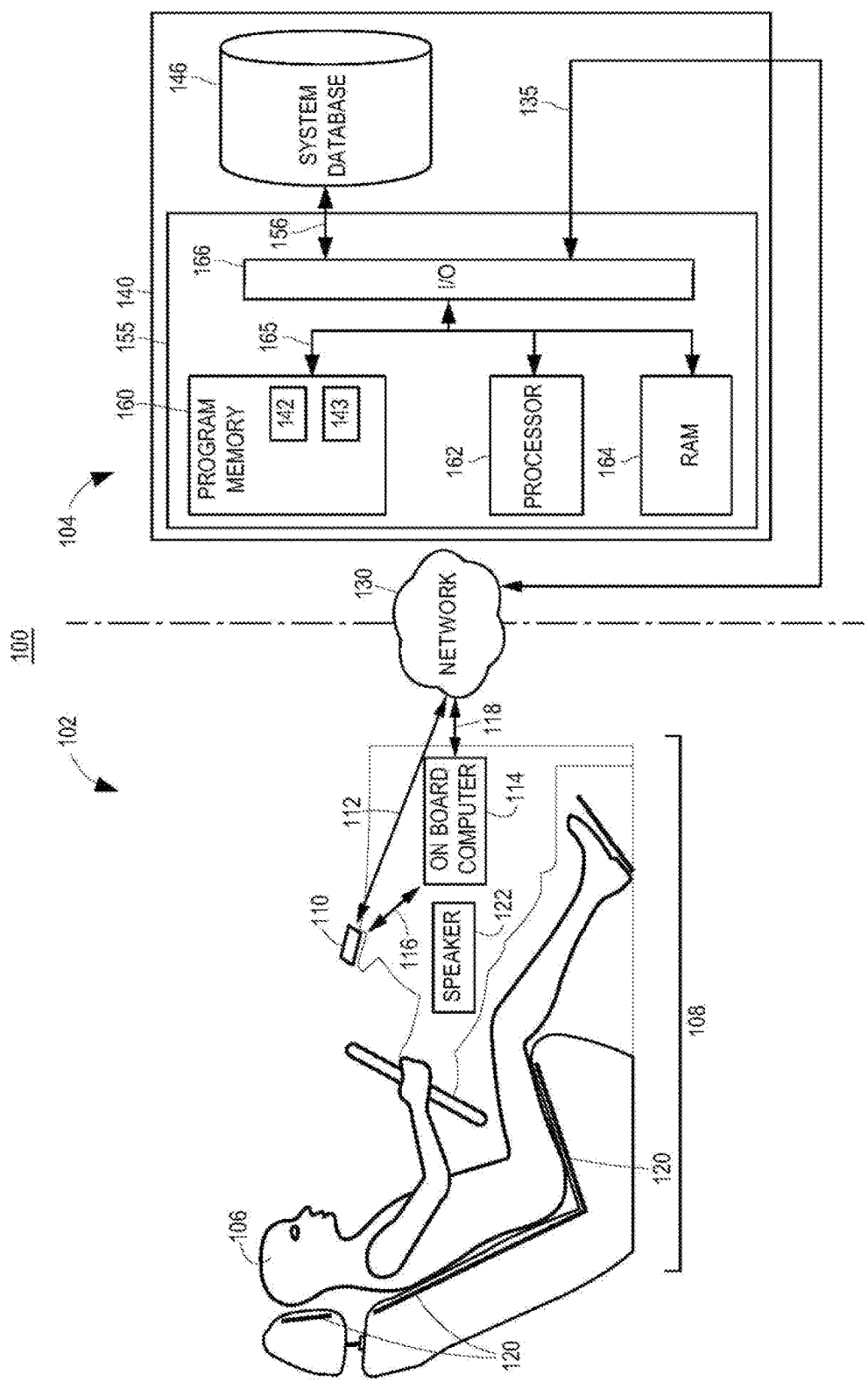
FIG. 1 illustrates a block diagram of an exemplary driver's education evaluation system 100 in accordance with an exemplary aspect of the present disclosure.

FIG. 1 illustrates a block diagram of an exemplary driver's education evaluation system 100 in accordance with an exemplary aspect of the present disclosure. Driver's education evaluation system 100 includes hardware and software applications, as well as various data communication channels for facilitating data communications between the various hardware and software components. Driver's education evaluation system 100 may be divided into front-end components 102 and back-end components 104.

In various aspects, any suitable number of front-end components 102 may be disposed within one or more devices 110. Device 110 may be permanently or removably installed in a vehicle 108 (e.g., a car, truck, etc.), brought into the vehicle during a driving session by a user, held by a user during a driving session, placed in a pocket of a user during a driving session, etc. In various aspects, device 110 may be implemented as any suitable computing device, such as a smartphone, mobile device, tablet computer, laptop computer, dedicated driver's education evaluation computer, wearable computing device, etc.

Additionally or alternatively, vehicle 108 may include an on-board computer 114. On-board computer 114 may be permanently installed in a vehicle 108 and may interface with various sensors in vehicle 108 (e.g., a braking sensor, a speedometer, a tachometer, etc.) and/or with various external output devices in vehicle 108 such as one or more tactile alert systems 120, one or more speakers 122, one or more displays, etc. A display is not shown in FIG. 1 for purposes of brevity. In various aspects, on-board computer 114 may be a general-use on-board computer configured to perform any suitable functions related to vehicle operation and/or may be implemented as a dedicated and/or special purpose computer, such as a driver's education evaluation computer, for example. In an aspect, on-board computer 114 may be installed by the manufacturer of vehicle 108, installed as an aftermarket modification to vehicle 108, etc. In various aspects, device 110 and/or on-board computer 114 may be a thin-client device, and as such, may share, outsource, and/or offload any suitable portion of processing to server 140 via network 130.

Those of ordinary skill in the art will appreciate that functions performed by either device 110 or on-board computer 114 may also be performed by on-board computer 114 in conjunction with device 110. For example, on-board computer 114 may supplement any suitable number of functions otherwise performed by device 110 described herein by, for example, sending and/or receiving information to and from device 110.

Device 110 and/or on-board computer 114 may communicate with network 130 over links 112 and 118, respectively. Additionally, device 110 and on-board computer 114 may communicate with one another via link 116. Vehicle 108 may also include a tactile alert system 120 (e.g., a seat that can vibrate) that may present tactile alerts to the vehicle operator 106 on command from device 110 and/or on-board computer 114. While shown in a slightly reclined sitting position, those of ordinary skill in the art will appreciate that the student driver 106 could be situated in any number of ways (e.g., reclining at a different angle, etc.) and operating the vehicle using controls other than the steering wheel and pedals shown in FIG. 1 (e.g., one or more sticks, yokes, levers, etc.).

In various aspects, front-end components 102 may include any suitable combination of hardware and/or software components that are configured to communicate with back-end components 104 via network 130. Network 130 may be any suitable network configured to facilitate communications between front-end components 102 and back end components 104. Network 130 may include, for example, a proprietary network, a secure public internet, a mobile-based network, a virtual private network, etc. Network 130 may include any suitable number of interconnected network components that form an aggregate network system, such as dedicated access lines, plain ordinary telephone lines, satellite links, cellular base stations, a public switched telephone network (PSTN), etc., or any suitable combination thereof. In aspects in which network 130 facilitates a connection to the Internet, data communications may take place over the network 130 via one or more suitable Internet communication protocols. Network 130 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 112, 116, and/or 118 may represent wired links, wireless links, or any suitable combination thereof.

Back-end components 104 may include a server 140. Server 140 may include one or more computer processors configured to execute various software applications, components of the driver's education evaluation system 100, and/or other suitable software applications. Server 140 may further include a database 146. Database 146 may be configured to store data related to the operation of driver's education evaluation system 100. Such data might include, for example, data collected by device 110 and/or on-board computer 114, which may pertain to the driver's education evaluation system 100 and may be uploaded to the server 140. This data may be in the form of images, vehicle status data, collected sensor data, data analyzed according to the methods discussed below, and/or any other suitable type of data. Server 140 may access data stored in database 146 when executing various functions and tasks associated with the operation of driver's education evaluation system 100.

Although driver's education evaluation system 100 is shown in FIG. 1 as including one server 140, one device 110, and one on-board computer 114, various aspects include driver's education evaluation system 100 implementing any suitable number of servers 140, devices 110, and/or on-board computers 114. For example, the driver's education evaluation system 100 may include a plurality of servers 140 and a large number (e.g., 100) of devices 110, any suitable number of which may be interconnected via the network 130.

Furthermore, in aspects whereby more than one server 140 is implemented, processing performed by the one or more servers may be distributed among the plurality of servers in an arrangement known as "cloud computing." According to this example, this configuration may provide several advantages, such as, for example, enabling near real-time uploads and downloads of information as well as periodic uploads and downloads of information. This may provide for a thin-client aspect of device 110 and/or on-board computer 114 discussed herein as well as acting as a backup of some or all of the data gathered by device 110 and/or on-board computer 114.

Alternatively, driver's education evaluation system 100 may include only front-end components 102. For example, device 110 and/or on-board computer 114 may perform any suitable portion of the processing associated with monitoring vehicle status data, receiving user input, generating driving session feedback scores and/or reports, displaying driving session feedback scores and/or reports, storing driving session feedback scores and/or reports, and/or sending driving session feedback scores and/or reports to back-end components 104 as discussed herein. As such, driver's education evaluation system 100 may be a "stand-alone" system, neither sending nor receiving information over network 130.

Server 140 may implement a controller 155 that is configured to communicate with database 146 via a link 156. As will be appreciated by those of ordinary skill in the relevant art(s), while not shown, additional databases may be linked to controller 155 in any suitable manner.

Controller 155 may include a program memory 160, a processor 162, a random-access memory (RAM) 164, and an input/output (I/O) circuit 166, any combination of which may be interconnected via an address/data bus 165. In various aspects, program memory 160 may be implemented as a non-transitory tangible computer readable memory configured to store computer-readable instructions, that when executed by the processor 162, cause the server 140 to perform various acts, such as implementing various applications stored in program memory 160. For example, program memory 160 may include a server application 142 and a web server 143.

The computer-readable instructions for server application 142 may cause server 140 to implement the methods and/or various aspects as described herein. While shown as a single block in FIG. 1, various aspects include server application 142 having any suitable number of different programs, modules, routines, and/or sub-routines that may collectively cause server 140 to run server application 142. Further, while the instructions for server application 142 and web server 143 are shown as being stored in program memory 160, various aspects may include the instructions being additionally or alternatively stored in database 146 and/or RAM 164.

Although only one microprocessor 162 is shown in FIG. 1, various aspects of server 140 may include multiple microprocessors 162. Similarly, aspects of the memory of controller 155 may include multiple RAMs 164 and multiple program memories 160.

Although I/O circuit 166 is shown as a single block, various aspects may include I/O circuit 166 being implemented as any suitable number and/or types of I/O circuits. RAM(s) 164 and program memories 160 may be implemented as semiconductor memories, magnetically readable memories, and/or optically readable memories, for example. The controller 155 may also be configured to communicate over network 130 via a link 135 and the I/O circuit 166.

In an aspect, device 110 may be configured with suitable hardware and/or software (e.g., one or more applications, programs, files, etc.) to facilitate receiving vehicle status data collected from on-board computer 114 during a driving session and to use this data to generate one or more driving session reports. Additionally or alternatively, device 110 may be configured to collect vehicle status data using one or more sensors that may be integrated as part of device 110.

For example, device 110 may collect vehicle status data related to one or more driving events such as braking, cornering, accelerating, vehicle speed, steering, stopping, following distance, a calculated time until stop based on the current speed and the following distance, an elapsed time since the driving session has started, the overall duration of the driving session, a route driven during the driving session, the overall distance driven during the driving session, etc. Once the driving session has ended, device 110 may use this data to generate a driving session report that may include information such as one or more metrics representative of the vehicle status data collected during the driving session and/or a driving session feedback score, which may be based upon these metrics. The driving session report and/or score may provide feedback to the student driver. In accordance with an aspect, device 110 is configured to generate one or more driving session reports using any of the techniques as described in commonly-assigned U.S. application Ser. No. 13/844,090, which is hereby incorporated by reference in its entirety.

In various aspects, device 110 may facilitate the creation and/or storage of profiles for one or more drivers. Further in accordance with such embodiments, device 110 may facilitate the storage of one or more driving session reports (which may also include driving session feedback scores) for each driver profile. For example, if an instructor has a class of several students, the instructor may utilize device 110 to create a profile for each student. A student profile may include any suitable type of information that is chosen to be associated with the student, such as the student's name, permit number, drivers' license number, contact information, a class and/or group that the student is enrolled in, etc. Upon starting a new driving session, a user (e.g., an instructor) may select the student profile from a displayed list of profiles, the details of which are further discussed below. Then, once the driving session has ended, device 110 may generate a driving session report, store the driving session report such that it is associated with the student profile, and/or send the driving session report to another device. Again, the driving session reports may be stored locally on device 110 and/or stored on a suitable portion of server 140.

Several driving session reports may be stored in this way under each student's profile, providing an efficient and paperless way to organize a log of driving session reports for each student. Furthermore, a user may utilize device 110 to select any suitable number of driving session reports from the history of stored driving session reports for comparison. For example, as will be further discussed below, upon selecting two driving session reports from a displayed history list, device 110 may display the two reports side by side, such that a student's progress over time may be conveniently viewed.

Figure 2:
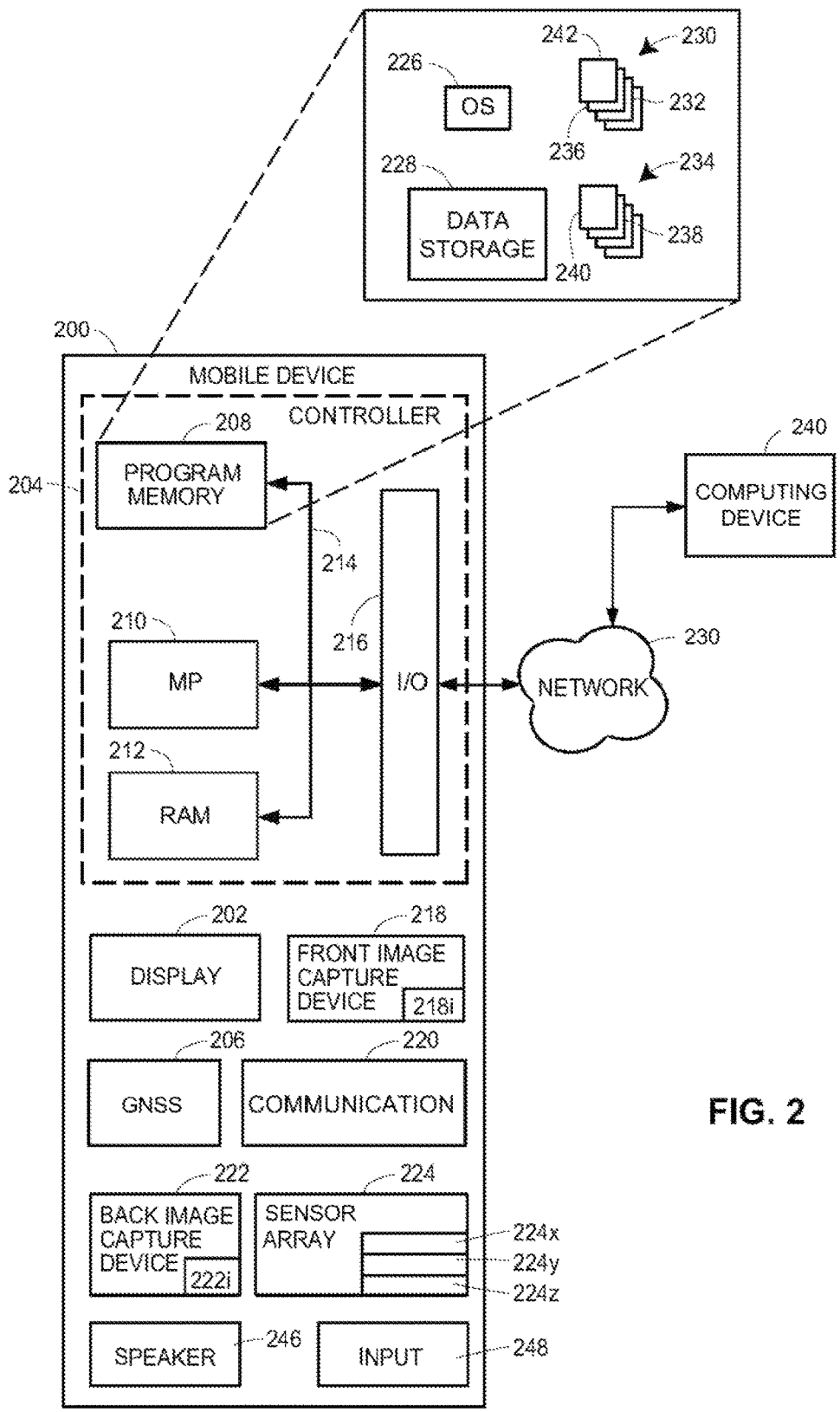
FIG. 2 illustrates a block diagram of an exemplary driver's education evaluation system 200 in accordance with an exemplary aspect of the present disclosure.

II. Collection of Vehicle Status Data and the Generation of Driving Session Reports FIG. 2 illustrates a block diagram of an exemplary driver's education evaluation system 200 in accordance with an exemplary aspect of the present disclosure. Driver's education evaluation system 200 includes a device 200, a network 230, and a computing device 240.

In various aspects, device 200 may be an implementation of device 110 and/or on-board computer 114, for example, as shown in FIG. 1. In some aspects, network 230 and computing device 240 may be implementations of network 130 and server 140, respectively, as shown in FIG. 1. In other aspects, computing device 240 may be implemented as any suitable external computing device configured to facilitate communications with device 200 and/or to store data, execute instructions, and/or facilitate the aspects described herein in conjunction with device 200.

Device 200 may include a display 202, a Global Navigation Satellite System (GNSS) unit 206, a communication unit 220, a front image capture device 218, a back image capture device 222, a sensor array 224, a user-input device 248, a speaker 246, and a controller 204.

In some aspects, device 200 may be implemented as a single device, such as device 110 or on-board computer 114, for example, as shown in FIG. 1. In other aspects, device 200 may be implemented as a device that may perform functions of two or more devices, such as a device that may perform functions of both device 110 and on-board computer 114, for example, as shown in FIG. 1.

Controller 204 may include a program memory 208, one or more microprocessors (MP) 210, a random-access memory (RAM) 212, and an input/output (I/O) circuit 216, any of which may be interconnected to one another via an address/data bus 214. Program memory 208 may include an operating system 226, a data storage 228, a plurality of software applications 230, and a plurality of software routines 234. Operating system 226, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

Data storage 228 may store data such as user profiles and preferences, application data for the plurality of applications 230, routine data for the plurality of routines 234, and any other suitable data to facilitate the interaction between device 200 and server 140 via network 130. In some embodiments, controller 204 may additionally or alternatively include or otherwise facilitate communications with other data storage mechanisms (e.g., one or more hard disk drives, optical storage drives, solid state storage devices, etc.) that may be integrated as part of device 200.

GNSS unit 206 may be configured to utilize any suitable communications protocol to facilitate global positioning system functions. For example, GNSS 206 may communicate with one or more satellites and/or wireless transmitters to determine a location of device 200. GNSS unit 206 may use "Assisted Global Positioning System" (A-GPS), satellite GPS, or any other suitable global positioning protocol (e.g., the GLONASS system operated by the Russian government, the Galileo system operated by the European Union, etc.) to determine a geographic position of device 200.

As will be appreciated by those of ordinary skill in the relevant art(s), A-GPS utilizes terrestrial cell phone towers or Wi-Fi hotspots (e.g., wireless router points) to more accurately and quickly determine a location of device 200 while satellite GPS is generally more useful in more remote regions that lack cell towers or Wi-Fi hotspots.

Front and back image capture devices 218 and 222, respectively, may be implemented as cameras integrated as part of device 200 and/or may be peripheral cameras, such as webcams, cameras installed inside a vehicle, cameras installed outside a vehicle, etc. In aspects in which front and back image capture devices 218 and 222 are implemented as devices external to device 200, front and back image capture devices 218 and 222 may be configured to communicate with device 200, for example, to send captured images to device 200. In various aspects, front image capture device 218 may be oriented toward the student driver 106 to observe the student driver 106, while back image capture device 222 may be oriented toward the front of the vehicle 108 to observe the road, lane markings, and/or other objects in front of the vehicle 108.

In some aspects, device 200 may implement both front image capture device 218 and back image capture device 222. In other aspects, device 200 may implement one of front image capture device 218 or back image capture device 222. Front image capture device 218 and/or back image capture device 222 may include an infrared illuminator 218*i*, 222*i*, respectively, to facilitate low light and/or night image capturing. As will be appreciated by those of ordinary skill in the relevant art(s), such an infrared illuminator 218*i*, 222*i* may be automatically activated when light is otherwise insufficient for image capturing.

Sensor array 224 may be implemented as any suitable number of sensors configured to monitor and quantify any suitable type of vehicle status data. As will be further discussed below, sensor array 224, when positioned or mounted within a vehicle during a driving session, may provide vehicle status data such as acceleration, cornering, and/or braking metrics, which may be used to generate a driving session report and/or driving session feedback score.

For example, sensor array 224 may include one or more accelerometers, gyroscopes, magnetometers, barometers, thermometers, proximity sensors, light sensors, Hall Effect sensors, etc. These sensors may be positioned to determine the force and direction of movements of the device 200, which may be mounted or otherwise positioned within a vehicle such that the force and directional movements of the device 200 reflect the direction and movement of the vehicle.

Sensor array 224 may include an accelerometer including one or more axis elements, such as an X-axis accelerometer 224*x*, a Y-axis accelerometer 224*y*, and a Z-axis accelerometer 224*z*, as shown in FIG. 2. Sensor array 224 may utilize accelerometers 224*x, y*, and *z* to measure the force and direction of movement in each of the X, Y, and Z dimensions, respectively. As will be appreciated by those of ordinary skill in the relevant art(s), a three-dimensional vector describing a movement of device 200 through three dimensional space may be established by combining the outputs of the X-axis, Y-axis, and Z-axis accelerometers 224*x, y, z* using any suitable methods.

GNSS unit 206, front image capture device 218, back image capture device 222, and sensor array 224 may be referred to collectively as "sensors" of device 200. As will be appreciated by those or ordinary skill in the relevant art(s), device 200 may include additional GNSS units 206, front image capture devices 218, back image capture devices 222, and/or accelerometer arrays 224 to facilitate the various functions as described herein.

Communication unit 220 may be configured to facilitate communications between device 200 and one or more external computing device, such as computing device 240, for example, via any suitable communication protocol and/or network (e.g., network 230). External computing devices in addition to computing device 240 are not shown in FIG. 2 for purposes of brevity. Communication unit 220 may also be configured to communicate with one or more external computing devices using a near field communication standard (e.g., ISO/IEC 18092, standards provided by the NFC Forum, etc.).

Display 202 may be implemented as any suitable type of display that may facilitate user interaction, such as a capacitive touch screen display, a resistive touch screen display, etc. In various aspects, display 202 may be configured to work in conjunction with user-input device 248 and/or controller 204 to detect user inputs upon a user selecting a displayed interactive icon or other graphic, to identify user selections of objects displayed via display 202, etc.

User-input device 248 may be configured to receive user-input to facilitate the aspects as described herein. For example, user-input device 248 may be implemented as a "soft" keyboard that is displayed on display 202, an external hardware keyboard communicating via a wired or a wireless connection (e.g., a Bluetooth keyboard), an external mouse, or any other suitable user-input device. User-input device 248 may include a microphone configured to receive user input in the form of voice input, such as voice commands, for example. In some aspects, voice commands received via user-input device 248 may be converted to text, for example, via controller 204. In this way, user-input device 224 may allow a user to enter text in lieu of typing in text by hand.

Although device 200 is illustrated in FIG. 2 as including one controller 204 having one microprocessor 210, device 200 may include any suitable number of controllers 204 and/or microprocessors 210. Similarly, the memory of controller 204 may include any suitable number of RAMs 212 and/or any suitable number of program memories 208. Although FIG. 2 depicts I/O circuit 216 as a single block, I/O circuit 216 may include any suitable number of I/O circuits, which may be the same type of I/O circuits or different types based upon the particular application and/or implementation of device 200. RAM(s) 212 and/or program memories 208 may be implemented as any suitable type of memory device, such as a non-transitory tangible computer readable memory, semiconductor memory, magnetically readable memory, and/or optically readable memory, for example.

As will be further discussed below, execution of instructions stored in RAM(s) 212 and/or program memories 208 may cause controller 204 and/or microprocessor to implement the methods/or various aspects as described herein. For example, microprocessor 210 may be configured to execute any suitable number of one or more of software applications 230 and/or any one or more of software routines 234 residing in program memory 208, in addition to other software applications.

One of applications 230 may be a client application 232 implemented as a series of machine-readable instructions executable by controller 204 and/or microprocessor 210 to facilitate performing the various tasks described herein associated with implementing the driver's education evaluation system 100. For example, client application 232 may include machine-readable instruction for implementing a user interface to allow a user to input commands and to view information displayed on display 202.

To provide an illustrative example, client application 232 may include instructions that facilitate receiving information via user-input device 248, collecting vehicle status data measured by sensor array 224, managing driver datasets by creating driver profiles and/or driver groups, calculating driver session feedback scores and/or driver session reports, associating the driver session feedback scores and/or driver session reports with the driver profiles, storing the driver profiles, storing the driver session feedback scores and/or storing the driver session reports in any suitable portion of controller 204 (or another suitable memory, e.g., a memory of computing device 240), displaying information on display 202, such as student information, displaying one or more driver session feedback scores and/or driver session reports, and/or transmitting information from device 200 (e.g., driving session reports) to an external computing device, such as computing device 240, etc.

One of the plurality of applications 230 may be a native web browser 236, such as Apple's Safari®, Google Android™ mobile web browser, Microsoft Internet Explorer® for Mobile, Opera Mobile™, that may be implemented as a series of machine-readable instructions for receiving, interpreting, and displaying web page information from computing device 240 or other back-end components while also receiving inputs from the user.

Another of the software applications 230 may include an embedded web browser 242, which may be implemented as a series of machine-readable instructions for receiving, interpreting, and displaying web page information from computing device 240 and/or other back-end components 104 within the client application 232.

One of the software routines 234 may include an image capture routine 238 that coordinates with the image capture devices 218, 222 to retrieve image data for use with one or more of the plurality of applications, such as the client application 232, or for use with other routines. Image capture routine may be implemented in conjunction with aspects that collect, as the vehicle status data, data indicative of the driver's gaze during the driving session. In such aspects, the corresponding vehicle status metrics may include tabular data corresponding to a gaze chart. Gaze tracking and a gaze chart may be determined and/or calculated by implementing any suitable technique, such as those described in commonly-assigned co-pending U.S. application Ser. No. 14/282,437, filed on May 20, 2014, which is hereby incorporated by reference in its entirety. In such aspects, a driver gaze chart and/or other driver gaze information may be displayed and/or included as part of the driving session reports, which are not otherwise illustrated herein for purposes of brevity.

Another of the software routines 234 may include a sensor routine 240 that determines the force and direction of movements of device 200 to facilitate the measurement, monitoring, collection, and/or quantifying of one or more vehicle status metrics. For example, sensor routine 240 may process data from sensor array 224 to determine a vector describing the motion of device 200 for use with client application 232. In some embodiments where sensor array 224 has accelerometers 224$x$, $y$, and $z$, sensor routine 240 may also combine the data from each accelerometer 224$x$, $y$, and $z$ to establish a vector describing the motion of device 200 through three dimensional space, and thus the motion of a respective vehicle. Furthermore, in some embodiments, sensor routine 240 may use data pertaining to less than three axes, such as when determining when a vehicle is braking, for example.

In some aspects, one or more of software applications 232 and/or software routines 234 may reside in program memory 208 as default applications that may be bundled together with the OS of device 200. For example, native web browser 236 and/or embedded web browser 242 may be part of software applications 230 that are included with the OS implemented by device 200.

In other aspects, one or more of software applications 232 and/or software routines 234 may be installed on device 200 as one or more downloads, such as an executable package installation file downloaded from a suitable application store via a connection to the Internet. For example, client application 232, image capture routine 238, and/or sensor routine 240 may be stored to suitable portions of program memory 204 upon installation of a package file downloaded in such a manner. Examples of package download files may include downloads via the iTunes store, the Google Play Store, the Windows Phone Store, downloading a package installation file from another computing device, etc. Once downloaded, client application 232 may be installed on device 200 as part of an installation package such that, upon installation of client application 232 on device 200, image capture routine 238, and/or sensor routine 240 may also be installed.

Once installed, a user may execute, or launch, client application 232 from device 200 by performing any suitable gesture. This gesture may be, for example, tapping an associated interactive icon with the user's finger that is displayed as part of display 202, for example, to open the application via user-input 248. As will be further explained below, a user may choose to launch client application 232 from device 200 to manage one or more driver datasets that may be associated with one or more driver profiles. For example, upon being launched, client application 232 may enable a user to initially create a driver profile, to enter information associated with the driver profile, and/or to cause the driver profile and any other associated information to be stored. A user may later launch client application 232 to retrieve the driver profile, for example, when a driver matching the retrieved profile begins a new driving session. During the driving session, client application 232 may monitor, collect, and store vehicle status data. Once the driving session has ended, client application 232 may facilitate additional functions as further described below, such as calculating a driving session report, displaying the driving session report, allowing a user to send the driving session report to another computing device, allowing one or more stored driving session reports to be compared to one another, etc.

Again, in some aspects, some or all of the functionality otherwise performed by device 200 may be shared and/or offloaded to another computing device, such as computing device 240, for example, as shown in FIG. 2. For example, in aspects in which device 200 functions as a thin-client device, a user may launch other software applications 232 and/or software routines 234 via user-input 248, for example, to interface with computing device 240. For example, a user may launch native web browser 236, embedded web browser 242, or any other one of software applications 230 to communicate with computing device 240, which may run a web server application. In such aspects, computing device 240 may receive, for example, vehicle status data and/or driver profile data from device 200, calculate driving session reports, store these driving session reports in any suitable memory and/or database, and/or send calculated driving session reports back to device 200. Once device 200 receives the calculated driving session reports from computing device 240, device 200 may display (e.g., via display 202) the driving session reports in conjunction with native web browser 236, for example.

In various aspects, the driving session report may include varying details collected during the driving session to provide the driver with feedback regarding her driving performance skills. For example, as will be further described below, the driving session report may include any suitable portion of the vehicle status data, or calculations based thereon, which are displayed in any suitable manner, such as via display 202, for example.

For example, the driving session report may include one or more driving event scores that are based upon aggregated driving status metrics for one or more driving events that occurred during a particular driving session. For example, driving events such as acceleration, cornering, and braking events may be chosen as the driving events to include in the driving session report. Using this as an example, the driving session report may include acceleration, cornering, and braking scores associated with a particular driving session. These scores may be calculated in any suitable manner from the driving status metrics. For example, acceleration data metrics for each of the acceleration, braking, and cornering driving events may be measured and quantified via sensor array 224 or any other suitable portion of device 200. Based upon these acceleration data metrics, the acceleration, braking, and cornering driving event scores may be calculated. In an aspect, the driving event scores may be determined by comparing acceleration data metrics for each driving event to a range of thresholds to first categorize each acceleration, cornering, and braking event within a severity level. The driving event scores may then be calculated, for example, by adjusting an initial driving event score based upon a number of driving events that occurred during a driving session and their respective severity levels.

To provide an illustrative example, severity scales may be based on any suitable range of threshold values for each type of driving event. Using acceleration as an example, a base threshold may be set as T1 m/s$^2$. That is, for an acceleration, braking, or cornering event to be considered as a driving event that will impact an initial driving event score, a minimum threshold acceleration of T1 m/s$^2$ should be measured. Once a driver accelerates beyond this threshold, the acceleration driving event may be assigned at least a "light" severity level. Continuing this example, a moderate acceleration driving event may be associated with acceleration values greater than T1 m/s$^2$ but less than T2 m/s$^2$, while severe acceleration driving events may be associated with acceleration values exceeding T2 m/s$^2$. This system may be further expanded to any suitable driving event category, such that a driving event score may be tailored based on any suitable number of driving event scores to be included in the driving session report, such as cornering, braking, etc.

Each driving event score may have a maximum, or "perfect," value associated therewith. This value could be, for example, 10, 100, 1000, etc. Each time a driving event occurs, this maximum score may be reduced for a corresponding driving event category by an amount commensurate with the severity level of the driving event. To provide an illustrative example, assume that a maximum acceleration driving event score attainable is 100. Further assume that 3 points are deducted from this score for each severe driving event, 2 points for each moderate driving event, and 1 point for each light driving event. If, during a driving session, the acceleration driving event status metrics indicate 4 severe events, 2 moderate events, and 6 light events, this would reduce the initial score of 100 by 22 points (12 for severe driving events, 4 for moderate driving events, and 6 for light driving events), resulting in a score of 78 for the acceleration driving event category.

In some aspects, the threshold ranges used for the severity categorization of driving events may be predetermined. In other aspects, the threshold ranges may be associated with a type of vehicle, which could be part of a driver profile. For example, if a driver has an assigned car, then these threshold ranges may be used to generate tagged driving events using vehicle-specific thresholds based on the type of car used by the driver. For example, a sport utility vehicle (SUV) may be assigned lower tagged driving event severity thresholds for cornering events than those for a sedan.

The driving session report may also include any other suitable type of data to provide a driver with feedback regarding his driving performance skills. For example, a driving session report may include a driving session feedback score that is based upon one or more driving event scores. As will be appreciated by those of ordinary skill in the relevant art(s), the driving session feedback score may be based upon any suitable combination of the driving event scores. For example, a weighting routine may be implemented that weights certain driving event scores higher than others. To provide another example, the driving session feedback score may be based upon an average of each of the driving event scores.

Additionally or alternatively, the driving session report may include any information obtained from the driving status data. For example, the driving session report may include an overall duration of a driving session, the distance traveled, an average following distance, the number of driving sessions for a particular driver based upon his profile, driving session feedback scores for the most recent driving session, driving session feedback scores for the previous driving session, trend indicators based upon recent driving session feedback scores, best and worst driving session feedback scores from a set of driving sessions, an average driving session feedback score from a set of driving sessions, etc.

III. Exemplary Client Application Screens

The following screens illustrated in FIGS. 3A-5C are examples of screens that may be displayed once a driving session feedback application is launched by a user in accordance with various aspects of the present disclosure. In an aspect, the screens illustrated in FIGS. 3A-5C may be displayed by any suitable device, such as device 110, on-board computer 114, and/or device 200, for example. As will be appreciated by those of ordinary skill in the relevant art(s), the example screens shown in FIGS. 3A-5C are for illustrative purposes, and the functions described herein with respect to each respective screen may be implemented using any suitable format and/or design without departing from the spirit and scope of the present disclosure.

FIG. 3A illustrates an example screen 300 for a device displaying a student roster screen in accordance with an exemplary aspect of the present disclosure. Screen 300 includes portions 302 and 304. Although not shown in FIG. 3A for purposes of brevity, a "splash screen" or other introductory graphic may be presented briefly (e.g., 2 or 3 seconds) to a user prior to the applicable device displaying the student roster screen as shown by screen 300.

Portion 302 may include any suitable graphic, information, label, prompt, etc., to display a list of students in a student roster view. Portion 302 may display a list of students as one or more interactive portions, such that a user may select a student as instructed at the top of portion 302. For example, a user may use an appropriate gesture, such as tapping a name from the list of students with the user's finger, etc. Upon selecting a student from the list, a user may access a driver summary screen associated with the student to view information corresponding to the selected driver, which will be further discussed below with respect to FIG. 5A.

Portion 304 may include any suitable graphic, information, label, prompt, etc., to allow a user to organize the list of students displayed in portion 302 and/or to facilitate navigation within the driving session feedback application. As shown in FIG. 3A, portion 304 may include additional interactive icons 306, 308, 310, and 312 to facilitate this navigation.

Upon being selected by a user via an appropriate gesture, each of interactive icons 306, 308, 310, and 312 results in the driving session feedback application performing respective functions. Selection of interactive icon 306 transitions to a new screen to allow a user to add new students to the class roster, which will be further discussed in reference to FIG. 3C. Selection of interactive icon 308 transitions to a new screen to allow a user to assign students to groups, which will be further discussed in reference to FIG. 3D.

Portion 302, as shown in FIG. 3A, is an example view corresponding to a user selecting interactive icon 310, which then displays the list of student names. The list of student names shown in portion 302 may be displayed such that they are sorted alphabetically. In various aspects, upon subsequent selections (e.g., a user repeatedly tapping) of interactive icon 310, the displayed list of student names may toggle, for example, between being sorted from A-Z, being sorted from Z-A, or being displayed in another manner, such as in the order in which the names were added, etc.

Selection of interactive icon 312 transitions to a new screen to allow a user to view the students in a group view as opposed to the class roster view show in FIG. 3A. The group view will be further discussed with reference to FIG. 3B.

FIG. 3B illustrates an example screen 320 for a device displaying a group roster screen in accordance with an exemplary aspect of the present disclosure. Similar to screen 300, screen 320 includes portion 304, which is maintained upon a user transitioning between the student roster display list in FIG. 3A to the group roster student list as shown in FIG. 3B, such that a user may continue to utilize portion 304 to navigate within various portions of the application as discussed herein.

However, screen 320 also includes portion 322. Portion 322 is an example view corresponding to a user selecting interactive icon 312 from portion 304, which results in the list of student names being displayed within their respective groups. Portion 322 may include any suitable graphic, information, label, prompt, etc., to display a list of students in a group roster view. In an aspect, while screen 320 is being displayed, selection of interactive icon 310 from portion 304, as shown in FIG. 3B, may cause the display of screen 320 to transition from displaying the grouped roster list as shown in portion 322 to the alphabetical list as shown in portion 302, as discussed with reference to FIG. 3A.

Portion 322 may display the same students as those displayed in the student roster list shown in FIG. 3A, but may organize how the students are shown in a different manner. As shown in FIG. 3B, portion 322 may include a list of one or more student groups. These groups may be assigned to each student at the time each student's driver profile is created, or may be added at any suitable time thereafter. These groups may represent, and thus be named, according to any useful organization of students that may assist a user in finding a student driver profile from a large group (e.g., 100) students.

For example, as shown in FIG. 3B, portion 322 may include groups corresponding to different student classes, such as "Wednesday 8 am," "Wednesday 11 am," etc. Although not shown in FIG. 3A for purposes of brevity, a "splash screen" or other introductory graphic may be presented briefly (e.g., 2 or 3 seconds) to a user prior to the applicable device displaying the student roster screen as shown by screen 320. As will be appreciated by those of ordinary skill in the relevant art(s), client application 232 may be implemented to display either screen 300 or screen 320 as a default starting location, such that the initial view presented to a user may be the student roster list as shown in FIG. 3A or the student group list as shown in FIG. 3B.

Portion 322 may include a list of student names expanded under each respective group. In an aspect, a user may interact with portion 322 to select the "+" symbol associated with each displayed group to toggle between the expanded list, as shown with respect to the Wednesday 8 am group, and the collapsed view of groups, as shown with respect to the other two groups as illustrated in portion 322.

Figures 3C, 3D:
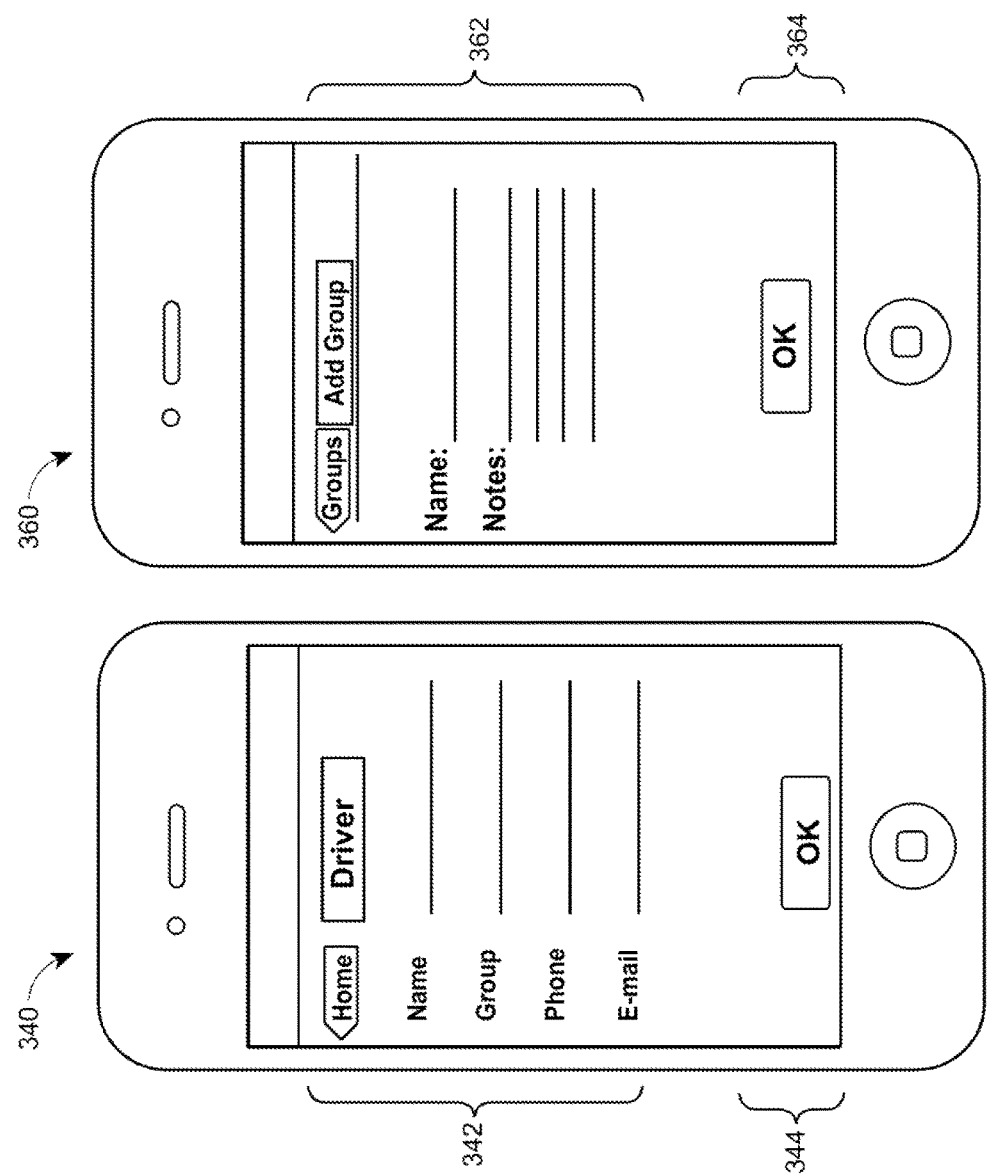
FIG. 3C illustrates an exemplary screen 340 for a device facilitating entry of new student driver information in accordance with an exemplary aspect of the present disclosure.
FIG. 3D illustrates an exemplary screen 360 for a device facilitating entry of new student group information in accordance with an exemplary aspect of the present disclosure.

FIG. 3C illustrates an example screen 340 for a device facilitating entry of new student driver information in accordance with an exemplary aspect of the present disclosure. Screen 340 is an example view corresponding to a user selecting interactive icon 306, as previously discussed with reference to FIG. 3A.

Screen 340 includes portions 342 and 344. Portion 342 includes a list of driver profile fields, which may be filled with text as selected by a user. Portion 342 may include any suitable graphic, information, label, prompt, etc., to facilitate displaying and collecting student information in accordance with the creation of a student driver profile.

For example, a user may select one of the blank profile fields, as shown in FIG. 3C. Upon selection of a blank profile field, a user may be provided with an interactive soft keyboard display. A user may then utilize this soft keyboard to fill in the desired information into the profile fields. Although portion 342 includes profile fields such as contact information and group information, portion 342 may include any suitable profile fields based upon the type of information that is desired to be collected and stored as part of a driver profile.

Portion 344 may include any suitable graphic, information, label, prompt, etc., to facilitate a user confirming that the profile fields have been filled out and that this information will be saved as part of a newly created driver profile. For example, once the user has entered the information associated with the student in portion 342, the user may select the "OK" interactive icon to save this information as a new driver profile.

In various aspects, upon a user indicating that the profile information is complete, the driver profile may be stored to any suitable location, such as a memory of controller 204, a database accessed by server 140, etc. Furthermore, upon the driver profile being saved, client application 232 may transition to any suitable screen, such as the student roster screen as shown in FIG. 3A, for example. In this way, once a driver profile has been created, a user may continue to create additional student profiles, to enter new student groups, etc., within client application 232 by selecting the appropriate interactive icon from portion 304 as previously discussed with reference to FIGS. 3A and 3B.

FIG. 3D illustrates an example screen 360 for a device facilitating entry of new student group information in accordance with an exemplary aspect of the present disclosure. Screen 360 is an example view corresponding to a user selecting interactive icon 308, as previously discussed with respect to FIG. 3A.

Screen 360 includes portions 362 and 364. Portion 362 includes a list of group profile fields, which may be filled in with text as selected by a user. Portion 362 may include any suitable graphic, information, label, prompt, etc., to facilitate the creation of one or more groups.

For example, a user may select the blank "name" field, as shown in FIG. 3D. Upon selection of the name field, a user may be provided with an interactive soft keyboard display. A user may then utilize this soft keyboard to fill in the group name into the name field. Using the examples shown from screen 320, as shown in FIG. 3B, a user may, for example, use this process to enter group names such as "Wednesday 8 am," "Wednesday 11 am," etc. To provide another example, a user may enter additional information into portion 362 such as notes, which may then be subsequently saved along with the creation of the new group.

Portion 364 may include any suitable graphic, information, label, prompt, etc., to facilitate a user confirming that the group fields have been filled out and saving this information as part of a new group. For example, once the user has entered the information associated with the group in portion 362, the user may select the "OK" interactive icon to save this information as a new group.

In various aspects, upon a user indicating that the group information is complete, the group may be stored to any suitable location, such as a memory of controller 204, a database accessed by server 140, etc., such that the group identification is associated with the student's driver profile. Furthermore, upon the group being saved, client application 232 may transition to any suitable screen, such as the student roster display, as shown in FIG. 3A, for example. In this way, once a group has been created, a user may continue to create additional student profiles, to enter new groups, etc., within client application 232 by selecting the appropriate interactive icon from portion 304 as previously discussed with reference to FIGS. 3A and 3B.

FIG. 4A illustrates an example screen 400 for a device facilitating modifications to the student roster in accordance with an exemplary aspect of the present disclosure. Screen 400 is an example view corresponding to a user performing an editing selection of a student name from the student roster screen or the group roster screen, as previously discussed with respect to FIGS. 3A and 3B, respectively.

In various aspects, a user may perform an editing selection of the student name from the student roster screen or the group roster screen by performing a suitable gesture indicating that the user desires to edit information associated with the selected student. For example, a user may "long press" a displayed student name by maintaining touch contact on the display for a period of time exceeding a threshold time period (e.g., 2 or 3 seconds). Upon receiving this user input, client application 232 may display screen 400, which may include one or more prompts to allow a user to edit or delete a student driver profile.

As shown in FIG. 4A, screen 400 may include a prompt overlaid on student roster screen 300 or group roster screen 320, as previously discussed with respect to FIGS. 3A and 3B, respectively. Therefore, screen 400 may maintain portion 304, which was also displayed in each of screens 300 and 320. In various aspects, a user may select one or more interactive icons from portion 304 to cancel the prompt and return to the applicable screen. However, upon the selection of the "edit" portion of the displayed prompt, client application 232 may transition to screen 420, as shown in FIG. 4B, whereas upon the selection of the "delete" portion of the displayed prompt, client application 232 may transition to screen 440, as shown in FIG. 4C.

FIG. 4B illustrates an example screen 420 for a device facilitating edits to the student roster upon selection of the edit portion of screen 400 in accordance with an exemplary aspect of the present disclosure.

As shown in FIG. 4B, screen 420 may be identical, or nearly identical, to screen 340, as shown in FIG. 3C. As a result, screen 420 may include one or more portions displaying information associated with a previously created driver profile. Once presented with screen 420, a user may select the interactive fields to edit and/or delete the information that is included in each of these fields. For example, a user may delete the group information from the respective field in screen 420 to dissociate John Doe from the Wednesday 8 am group.

In an aspect, this information shown in screen 420 may be associated with data that is stored as part of a respective student driver profile. For example, once the student driver profile has been created by a user as previously discussed with regards to FIG. 3C, this data may be stored in a suitable location. In an aspect, the populated fields shown in screen 420 may correspond to data that is stored with the selected student's name as part of that student's driver profile data and retrieved from this location once a user selects the edit prompt. Similar to the process described in regards to FIG. 3C, once the student driver profile fields have been updated, a user may re-save these changes, thus applying these changes to the data associated with the selected student's driver profile to overwrite this data.

FIG. 4C illustrates an example screen 440 for a device facilitating deletions to the student roster upon selection of the delete portion of screen 400 in accordance with an exemplary aspect of the present disclosure. As previously discussed with regards to FIG. 4B, a user may update data associated with a student driver profile. A user may also delete stored driver profile information for one or more students. In an aspect, any number of additional steps may be added to ensure that the user does not accidentally delete the student driver profile, such as the confirmation step displayed in FIG. 4C, for example.

FIG. 5A illustrates an example screen 500 for a device displaying a driver summary screen for a driver selected from the student roster list or the group roster list as shown in FIGS. 3A and 3B, respectively. Screen 500 includes portions 502 and 504. Portion 502 may include any suitable graphic, information, label, prompt, etc., to facilitate displaying a driver summary.

In some aspects, screen 500 is an example view corresponding to a user selecting a student's name from the student roster or the group roster as shown in FIGS. 3A and 3B, respectively. In such aspects, screen 500 may display a driver summary using data associated with the selected student's driver profile upon selection of a student from the student roster list or the group roster list.

Portion 502 may include any portion of vehicle status data used to generate driving session reports and/or scores for a selected driver. A user may select a new driver by selecting the interactive portion of portion 502 labeled "change driver," which may result in the display transitioning to the student roster list or the group roster list as shown in FIGS. 3A and 3B, respectively.

As previously discussed, a driver may participate in several driving sessions, or trips, in which driving session reports are generated and saved as part of the driver's profile. These driving session reports, in turn, may include a driving session feedback score for each of these trips. The driver summary shown in portion 502 may include information collected during any suitable number of driving sessions. For example, portion 502 includes a driving session feedback score (75) for a selected driver John Smith associated one or more driving sessions stored as part of John Smith's driver profile. In some aspects, the driving session feedback score may indicate a driving session feedback score for a single driving session stored in the driver profile. In other aspects, the driving session feedback score may indicate an average driving session feedback score for two or more driving sessions stored in the driver profile.

The driving session feedback score may correspond to any suitable combination, weighting, aggregation, etc., of vehicle status data scores for the selected driving session. For example, the driving session feedback score shown in FIG. 5A of 75 may correspond to an average of the vehicle status data scores for a selected driving session, for two driving sessions, for the most recent driving session, etc.

Portion 502 may also include information in addition to the driving session feedback score as shown in FIG. 5A. For example, portion 502 may include information such as the sum total of driving session times for trips (driving sessions) in which the selected driver has participated (13 minutes), a number of trips (2), the sum total of distance traveled over each of the driving sessions (4.8 miles), etc.

Furthermore, portion 502 may include one or more vehicle status data scores, such as the acceleration, braking, and cornering scores, for example, as shown in FIG. 5A. In various aspects, the vehicle status data scores may correspond to any suitable combination of the aggregated vehicle status data scores for the selected driver. For example, in some aspects, the acceleration (85), braking (60), and cornering (88) scores may correspond to a single selected driving session stored as part of under John Smith's driver profile. To provide another example, in other aspects, the vehicle status data scores may be an average of two or more trips stored under John Smith's driver profile, the best vehicle status data scores from each of the trips stored under John Smith's driver profile, the worst vehicle status data scores from each of the trips, etc.

To provide an illustrative example, the acceleration (85), braking (60), and cornering (88) scores shown in portion 502 provide an average score of 78 when rounded up. In some aspects, the driving session feedback score shown in portion 502 may indicate this average instead of the driving session feedback score of 75. However, in other aspects, the driving session feedback score of 75 may indicate an average score over two or more driving sessions. Using this example, the driving session feedback score of 75 as shown in FIG. 5 may be calculated as an average of both the vehicle status data scores shown in portion 502 (78) and vehicle status data scores from other driving sessions.

In some aspects, the aggregated vehicle status data scores may be displayed in such a manner that aggregated vehicle status data scores from various driving sessions may be concurrently displayed in portion 502. For example, as shown in FIG. 5A, the acceleration score of 85 may correspond to a point on the scaled bar associated with marker 501, while the best acceleration score from each of the trips stored in John Smith's driver profile is slightly better than this score, as shown by the rightmost point of the scaled bar at marker 503. Similarly, the cornering score of 88 may correspond to a point on the scaled bar associated with marker 505, while the best cornering score from each of the trips stored in John Smith's driver profile is slightly worse than this score, as shown by the leftmost point of the scaled bar at marker 507 where the shading transitions. In this way, the driver summary screen may include a graphical representation of vehicle status data from any suitable number of driving sessions.

Furthermore, portion 502 may include additional information such as John Smith's average driving session feedback score from his two trips (72), his previous driving session feedback score (71), his best driving session feedback score (78), his worst driving session feedback score (65), a trend in movement of recent driving session feedback scores (upwards), etc.

Portion 504 may include any suitable graphic, information, label, prompt, etc., to facilitate navigation within the driving session feedback application. For example, as shown in FIG. 5A, portion 504 includes interactive icons 506, 508, and 510 to facilitate this navigation.

Interactive icon 506 may facilitate, upon selection thereof by a user, the start of a new driving session. In other words, when an instructor is taking a student out on a new driving session, the instructor may select the student's name from the student roster or the group roster as shown in FIGS. 3A and 3B, respectively, to transition the displayed screen 300 or 320 to screen 500. Once the student is ready to drive, the instructor may indicate that a new driving session is starting by selecting interactive icon 506. Then, a device running client application 232, such as device 200, for example, may start collecting vehicle status data as previously discussed. Once the driving session has ended (or the device detects the termination thereof) the collected driving status data, a driving session report, and/or a driving session feedback score may be stored and associated with this trip under that student's driver profile.

Upon the selection of interactive icon 508, client application 232 may transition to screen 520, as shown in FIG.

5B, which will be further discussed below. Upon the selection of interactive icon 510, client application 232 may transition to another screen to facilitate a user sending the driver profile to another device. This screen is not shown for purposes of brevity, but may include any suitable user interface to allow a user to send the driver summary to another external device, such as via an email application, a short-messaging service (SMS) application, etc. For example, if client application 232 is running on device 200, then a user may select interactive icon 510 to email or text the driver summary (which may include a log of all driver session reports, driver status data, and/or driving session feedback scores for each trip) to computing device 240.

FIG. 5B illustrates an example screen 520 for a device facilitating the selection of two or more driving session reports for comparison corresponding to the driver as shown in FIG. 5A. Screen 520 may include any suitable graphic, information, label, prompt, etc., to facilitate the presentation of any suitable number of driving session reports and/or receiving input from a user identifying a selection of one or more of the displayed driving session reports.

As shown in FIG. 5B, screen 520 includes a list of driving sessions and their corresponding driving session feedback scores associated with the selected driver John Smith. Although screen 520 includes instructions to select only two trips to compare, various aspects include client application 232 allowing a user to select any suitable number of trips for comparison. The list of trips may include information in addition to the driving session feedback scores for each trip, such as a name of each trip, a date and time associated with each trip, etc. As will be appreciated by those of ordinary skill in the relevant art(s), the list of trips may be ordered in any suitable way, such as chronologically from the most recent to the oldest trip, from the oldest trip to the most recent trip, from the best driving session feedback score to the worst driving session feedback score, etc.

In an aspect, client application 232 may include instructions that facilitate a suitable device displaying screen 520 (e.g., device 200) to identify which driving sessions have been selected by a user by receiving a suitable input via the interactive display. As will be appreciated by those of ordinary skill in the relevant art(s), this input may be any suitable type of data identifying the selection of one or more of the driving sessions once selected by a user. Upon selection of a suitable number of trips for comparison, client application 232 may transition to screen 540, as shown in FIG. 5C, which will be further discussed below.

FIG. 5C illustrates an example screen 540 for a device displaying two driving session reports corresponding to the selected driving session reports as shown in FIG. 5B. Screen 540 may include any suitable graphic, information, label, prompt, etc., to facilitate the visual comparison of two or more driving session reports and/or scores at the same time.

Screen 540 may facilitate a comparison between any suitable number of driving session feedback scores, driving session reports, and/or other suitable information based upon the driving status data collected for each respective driving session. For example, as shown in FIG. 5C, screen 540 includes a comparison between a driving session resulting in a driving session feedback score of 88 with another driving session resulting in a driving session feedback score of 50. Furthermore, screen 540 may include additional information associated with each driving session, such as the time and date of a driving session for which each driving session feedback score was calculated, durations of each driving session, a total distance traveled for each driving session, etc. Additionally, screen 540 may include vehicle status data scores for each driving session, such as the acceleration, braking, and cornering scores, for example, as shown in FIG. 5C. In this way, an instructor may view driving session report information from multiple driving sessions for a student in a side-by-side fashion to quickly and easily ascertain a student's progress. As a result, an instructor may easily determine driving skills in which a student has improved between these driving sessions versus driving skills in which a student is still having difficulties.

Figure 6:
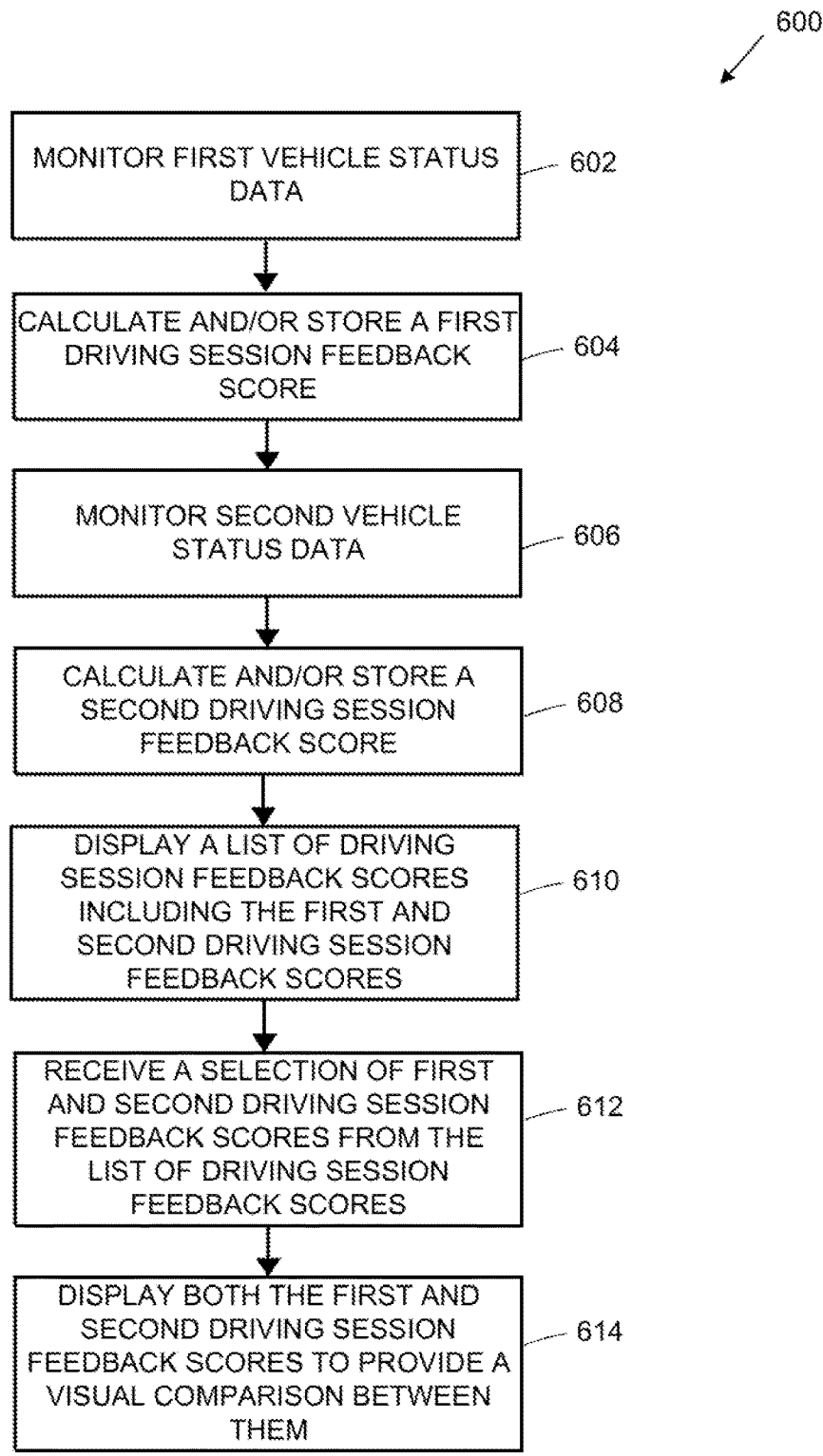
FIG. 6 illustrates an exemplary method 600 in accordance with an exemplary aspect of the present disclosure.

IV. An Exemplary Method for Providing a Visual Comparison Between Driving Session Feedback Scores FIG. 6 illustrates an example method 600 in accordance with an exemplary aspect of the present disclosure. In the present aspect, method 600 may be implemented by any suitable device, such as device 110, device 200, on-board computer 114, and/or server 140, as shown in FIGS. 1 and 2, for example. In an aspect, method 600 may be performed by one or more processors, applications, and/or routines, such as any suitable portion of controller 204, applications 230, and/or routines 234, for example, as shown in FIG. 2.

Method 600 may start when one or more processors monitor first vehicle status data (block 602). This first vehicle status data may include, for example, vehicle status data monitored by one or more sensors during a first driving session, such sensor array 224 and/or GNSS unit 206, for example, as shown and described with reference to FIG. 2. In an aspect, method 600 may begin monitoring the first vehicle status data (block 602) in response to receiving an applicable user input, such as a user selecting a "record trip" interactive icon 506, as previously shown and discussed with reference to FIG. 5A, for example.

Method 600 may include one or more processors calculating a first driving session feedback score (block 604). In an aspect, the first driving session feedback score may be calculated (block 604) based upon the first vehicle status data (block 602). This first driving session feedback score may include, for example, a driving session feedback score for the first driving session that is an average of one or more driving status scores monitored during the first driving session, such as acceleration, braking, and cornering scores, for example (block 604). In an aspect, the first driving session feedback score may be calculated (block 604) upon the detection of the end of the first driving session and/or upon receiving an appropriate user input indicating that the first driving session has ended. In an aspect, once calculated, the first driving session feedback score may also be stored in a suitable memory (e.g., a memory associated with controller 204) as part of a driver profile associated with the driver (block 604) for which the first vehicle status data was monitored (block 602) during the first driving session.

Method 600 may include one or more processors monitoring second vehicle status data (block 606). This second vehicle status data may include, for example, vehicle status data monitored by one or more sensors during a second driving session, such sensor array 224 and/or GNSS unit 206, for example, as shown and described with reference to FIG. 2. In an aspect, method 600 may begin monitoring the second vehicle status data (block 606) in response to receiving an applicable user input, such as a user selecting a "record trip" interactive icon 506, as previously shown and discussed with regards to FIG. 5A, for example.

Method 600 may include one or more processors calculating a second driving session feedback score (block 608). In an aspect, the second driving session feedback score may be calculated (block 608) based upon the second vehicle status data (block 606). This second driving session feedback score may include, for example, a driving session feedback score for the second driving session that is an average of one or more driving status scores monitored during the second driving session, such as acceleration, braking, and cornering scores, for example (block 608).

In an aspect, the second driving session feedback score may be calculated (block 608) upon the detection of the end of the second driving session and/or upon receiving an appropriate user input indicating that the second driving session has ended. In an aspect, once calculated, the second driving session feedback score may also be stored in a suitable memory (e.g., a memory associated with controller 204) as part of a driver profile associated with the driver (block 608) for which the second vehicle status data was monitored (block 606) at the start of the second driving session.

Method 600 may include one or more processors displaying a list of driving session feedback scores including the first (block 604) and the second (block 608) driving session feedback scores (block 610). This list of driving session feedback scores may include a list of driving sessions and their respective driving session feedback scores (block 610), as shown and discussed with reference to FIG. 5B, for example.

Method 600 may include one or more processors receiving a selection of first and second driving session feedback scores (block 612) from the displayed list of driving session feedback scores (block 610). This selection may include, for example, a user selecting two or more driving session feedback scores by utilizing an interactive display (block 612), as shown and discussed with reference to FIG. 5B, for example.

Method 600 may include one or more processors displaying both the first and the second driving session feedback scores to provide a visual comparison between them (block 614). This may include, for example, two driver session feedback scores being displayed at the same time positioned side-by-side, such as the display of two driving session feedback scores as shown and discussed with reference to FIG. 5C, for example.

V. An Exemplary Method for Managing a Driver Dataset

Figure 7:
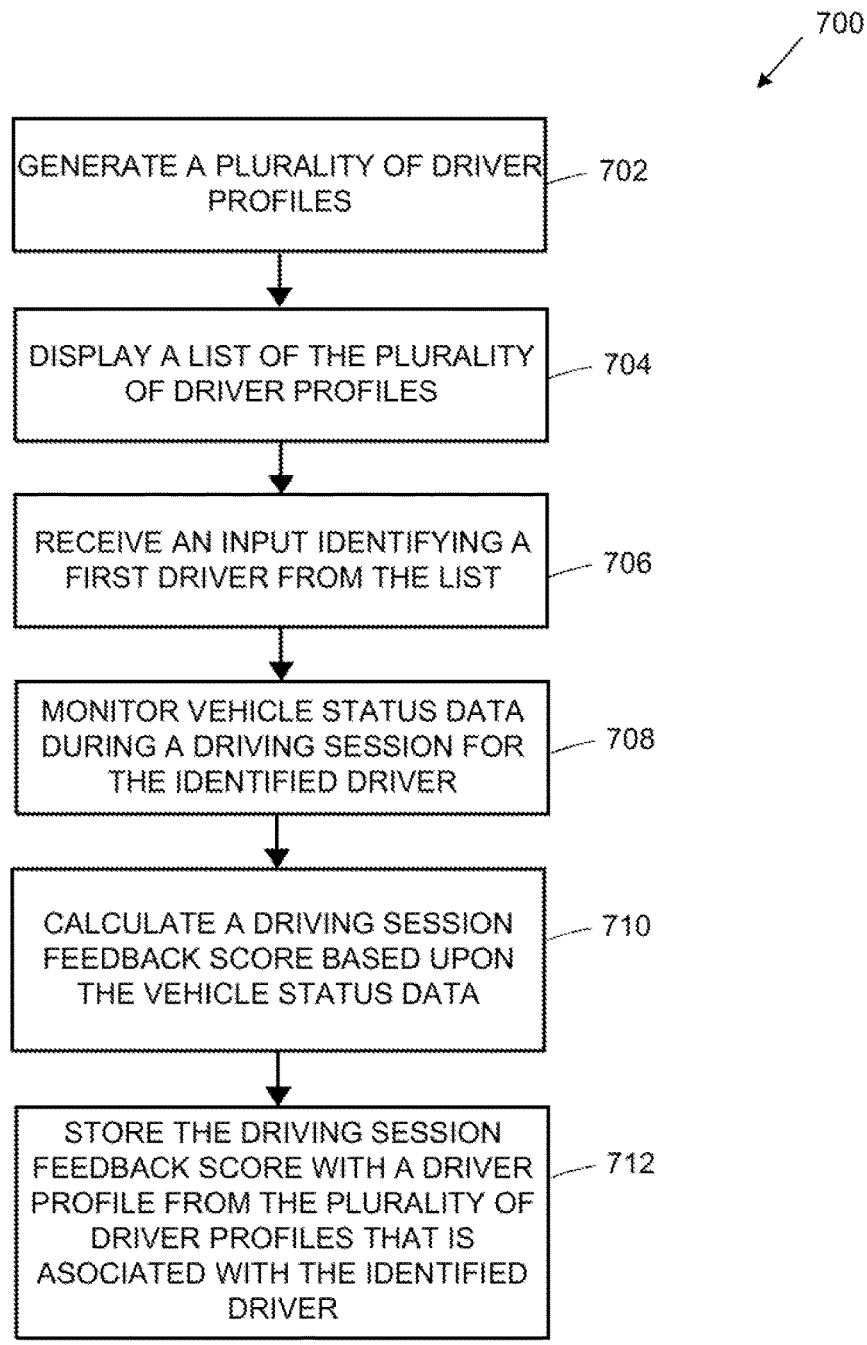
FIG. 7 illustrates an exemplary method 700 in accordance with an exemplary aspect of the present disclosure.

FIG. 7 illustrates an example method 700 in accordance with an exemplary aspect of the present disclosure. In the present aspect, method 700 may be implemented by any suitable device, such as device 110, device 200, on-board computer 114, and/or server 140, as shown in FIGS. 1 and 2, for example. In an aspect, method 700 may be performed by one or more processors, applications, and/or routines, such as any suitable portion of controller 204, applications 230, and/or routines 234, for example, as shown in FIG. 2.

Method 700 may start when one or more processors generates a plurality of driver profiles (block 702). This plurality of driver profiles may be generated, for example, based upon input received from a user entered via an appropriate interactive display, for example, as shown and described with reference to FIGS. 3A and 3C. In an aspect, method 700 may generate the plurality of driver profiles by a user first selecting an interactive icon, such as interactive icon 306, for example, as previously shown and discussed with reference to FIG. 3A, to indicate that a new driver is to be added (block 702). Then, a user may further enter the information for the new driver, as shown and discussed with reference to FIG. 3C (block 702). A user may repeat this process to add any suitable number of drivers to generate the plurality of driver profiles (block 702).

Method 700 may include one or more processors displaying a list of the plurality of driver profiles (block 704). This may include, for example, a device displaying a student roster list or a group roster list as shown and discussed with reference to FIGS. 3A and 3B, respectively.

Method 700 may include one or more processors receiving an input identifying a first driver from the displayed list of driver profiles (block 706). This may include, for example, an input being received upon a user selecting a student from the student roster list or the group roster list by performing an appropriate gesture, as shown and discussed with reference to FIG. 5A.

Method 700 may include one or more processors monitoring vehicle status data during a driving session for the identified driver (block 708). This vehicle status data may include, for example, vehicle status data monitored by one or more sensors during a first driving session, such sensor array 224 and/or GNSS unit 206, for example, as shown and described with reference to FIG. 2. In an aspect, method 700 may begin monitoring the vehicle status data (block 708) in response to receiving an applicable user input, such as a user selecting a "record trip" interactive icon 506, as previously shown and discussed with regards to FIG. 5A, for example.

Method 700 may include one or more processors calculating a driving session feedback score (block 710). In an aspect, the driving session feedback score may be calculated (block 710) based upon the vehicle status data (block 708). This driving session feedback score may include, for example, a driving session feedback score for the driving session that is an average of one or more driving status scores monitored during the driving session, such as acceleration, braking, and cornering scores, for example (block 708). In an aspect, the driving session feedback score may be calculated (block 710) upon the detection of the end of the driving session and/or upon receiving an appropriate user input indicating that the first driving session has ended.

Method 700 may include one or more processors storing the driving session feedback score with a driver profile from among the plurality of driver profiles that is associated with the identified driver (block 712). In an aspect, once calculated, the driving session feedback score may be stored in a suitable memory, such as a memory associated with controller 204, for example, as part of a driver profile associated with the driver (block 712) for which the vehicle status data was monitored (block 708).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed:

1. A computer-implemented method for managing a driver dataset via a portable computing device, comprising:
   generating, by one or more processors of the portable computing device, a plurality of driver profiles, each of the plurality of driver profiles being associated with one of a plurality of drivers in a class roster in which the plurality of drivers are grouped into a plurality of group rosters;
   displaying, by one or more processors, a list of the plurality of drivers in the class roster in one of (i) a roster view, or (ii) a group view, upon a user selecting one of a name view interactive icon or a group view interactive icon, respectively, the name view interactive icon and the group view interactive icon being displayed concurrently with each of the roster view and the group view;
   receiving, by one or more processors, a first input identifying a first driver from the plurality of drivers in either the roster view or the group view;
   transitioning, by one or more processors upon receipt of the first input, from the roster view or the group view to a summary view including:
      concurrently displaying, by one or more processors, (i) a graphical and numeric representation of vehicle status data scores associated with a most recent driving session feedback score for a vehicle being driven by the identified first driver during a most recent driving session including a plurality of scaled bars, each of the plurality of scaled bars including a marker indicating a respective vehicle status data score for the most recent driving session, and each of the plurality of scaled bars being filled to show a transition between aggregated vehicle status data scores for the vehicle being driven by the identified first driver during a plurality of driving sessions and the vehicle status data score for the most recent driving session, (ii) a graphical representation of an average of vehicle status data scores for the vehicle being driven by the identified first driver during the plurality of driving sessions taking place prior to the most recent driving session, and (iii) a trip recording interactive icon,
   upon receiving a second input corresponding to a selection of the trip recording interactive icon:
      collecting, by one or more processors, first vehicle status data that is measured via one or more sensors associated with the portable computing device;
      calculating, by one or more processors, a first driving session feedback score based upon the first vehicle status data for the vehicle being driven by the identified first driver during a new driving session taking place after the most recent driving session; and
      storing, by one or more processors, the first driving session feedback score with a first driver profile from among the plurality of driver profiles that is associated with the identified first driver,
   wherein the graphical representation of vehicle status data scores for the most recent driving session and the graphical representation of the average vehicle status data scores from the plurality of driving sessions are presented concurrently on the same respective scales to indicate an amount in which the vehicle status data scores for the most recent driving session are greater than or less than the average vehicle status data scores from the plurality of driving sessions taking place prior to the most recent driving session.

2. The computer-implemented method of claim 1, further comprising:
   receiving, by one or more processors, a second input identifying a second driver from the plurality of drivers in either the roster view or the group view;
   monitoring, by one or more processors, second vehicle status data corresponding to a vehicle being driven by the identified second driver during a driving session upon receipt of the second input;
   calculating, by one or more processors, a second driving session feedback score based upon the second vehicle status data; and
   storing, by one or more processors, the second driving session feedback score with a second driver profile from among the plurality of driver profiles that is associated with the second driver.

3. The computer-implemented method of claim 1, wherein the act of receiving the first input comprises:
   receiving a touch screen selection, from a user, indicative of the first driver from the plurality of drivers in either the roster view or the group view to identify the first driver.

4. The computer-implemented method of claim 1, wherein the act of displaying the list of the plurality of drivers in the group view comprises:
   displaying the plurality of group rosters in an initial collapsed view that lists each of the plurality of group rosters, and further comprising:
   upon a user selecting one of collapsed group rosters, expanding the selected group roster such that the plurality of drivers associated with the selected group roster are displayed.

5. The method of claim 1, wherein the name view interactive icon and the group view interactive icon are from among a plurality of interactive icons including a new driver interactive icon, and further comprising:
   transitioning, by one or more processors, to a new driver screen upon a user selecting the new driver interactive icon to facilitate adding a new driver to the plurality of drivers.

6. The method of claim 5, wherein the new driver screen includes a list of driver profile fields in which a user can enter information for a new driver profile that is associated with the new driver and, once submitted by a user, added to the plurality of driver profiles.

7. The method of claim 6, wherein the list of driver profile fields includes a group field to facilitate the identification of the new driver with a group roster from among the plurality of group rosters.

8. The method of claim 1, wherein the name view interactive icon and the group view interactive icon are from among a plurality of interactive icons including a new group interactive icon, and further comprising:
   transitioning, by one or more processors, to a new group roster screen upon a user selecting the new group interactive icon to facilitate adding a new group roster to the plurality of group rosters.

9. The method of claim 8, wherein the new group roster screen includes a name profile field to facilitate the identification of the new group roster from among the plurality of group rosters.

10. The method of claim 1, wherein the name view interactive icon and the group view interactive icon are from among a plurality of interactive icons including a sorting interactive icon, the sorting interactive icon (i) sorting the plurality of drivers in alphabetical order when selected by a user in the roster view, and (ii) sorting the plurality of group rosters in alphabetical order when selected by a user in the group view.

11. A device, comprising:
a processor configured to generate a plurality of driver profiles, each of the plurality of driver profiles being associated with one of a plurality of drivers in a class roster in which the plurality of drivers are grouped into a plurality of group rosters;
a display unit configured to display a list of the plurality of drivers in the class roster in one of (i) a roster view, or (ii) a group view, upon a user selecting one of a name view interactive icon or a group view interactive icon, respectively, the name view interactive icon and the group view interactive icon being displayed concurrently with each of the roster view and the group view; and
a user interface configured to receive a first input identifying a first driver from the plurality of drivers in either the roster view or the group view,
wherein the display unit is further configured to transition, upon receipt of the first input, from the roster view or the group view to a summary view to concurrently display (i) a graphical and numeric representation of vehicle status data scores associated with a most recent driving session feedback score for a vehicle being driven by the identified first driver during a most recent driving session a plurality of scaled bars, each of the plurality of scaled bars including a marker indicating a respective vehicle status data score for the most recent driving session, and each of the plurality of scaled bars being filled to show a transition between aggregated vehicle status data scores for the vehicle being driven by the identified first driver during a plurality of driving sessions and the vehicle status data score for the most recent driving session, (ii) a graphical representation of an average of vehicle status data scores for the vehicle being driven by the identified first driver during a plurality of driving sessions taking place prior to the driving session, and (iii) a trip recording interactive icon,
wherein the user interface is further configured to receive a second input corresponding to a selection of the trip recording interactive icon, and
wherein the processor is further configured to, upon receiving the second input:
(i) collect first vehicle status data that is measured via one or more sensors associated with the device, (ii) calculate a first driving session feedback score based upon the first vehicle status data for the vehicle being driven by the identified first driver during a new driving session taking place after the most recent driving session, and (iii) store the first driving session feedback score with a first driver profile from among the plurality of driver profiles that is associated with the identified first driver,
wherein the display unit is further configured to present the graphical representation of vehicle status data scores for the most recent driving session and the graphical representation of the average vehicle status data scores from the plurality of driving sessions concurrently on the same respective scales to indicate an amount in which the vehicle status data scores for the most recent driving session are greater than or less than the average vehicle status data scores from the plurality of driving sessions taking place prior to the most recent driving session.

12. The device of claim 11, wherein the user interface is further configured to receive a second input identifying a second driver from the plurality of drivers in either the roster view or the group view, and
wherein the processor is further configured to (i) monitor second vehicle status data corresponding to a vehicle being driven by the identified second driver during a driving session upon receipt of the second input, (ii) calculate a second driving session feedback score based upon the second vehicle status data, and (iii) store the second driving session feedback score with a second driver profile from among the plurality of driver profiles that is associated with the second driver.

13. The device of claim 11, wherein the device is a portable computing device.

14. The device of claim 11, wherein the user interface is further configured to receive a touch screen selection as the first input from a user, via the display unit, indicative of the first driver from the plurality of drivers in either the roster view or the group view to identify the first driver.

15. The device of claim 11, wherein:
the display unit is further configured to display the list of the plurality of drivers in the group view in an initial collapsed view that lists each of the plurality of group rosters, and
the processor is further configured to receive a group roster touch screen selection from a user, and
the display unit is further configured to, upon receipt of the group roster touch screen selection, to expand the selected group roster such that the plurality of drivers associated with the selected group roster are displayed.

16. The device of claim 11, wherein the name view interactive icon and the group view interactive icon are from among a plurality of interactive icons including a new driver interactive icon, and
wherein the display unit is further configured to transition to a new driver screen upon a user selecting the new driver interactive icon via the user interface to facilitate adding a new driver to the plurality of drivers.

17. The device of claim 16, wherein the new driver screen includes a list of driver profile fields in which a user can enter information for a new driver profile that is associated with the new driver and, once submitted by a user via the user interface, added to the plurality of driver profiles.

18. The device of claim 17, wherein the list of driver profile fields includes a group field to facilitate the identification of the new driver, via the user interface, with a group roster from among the plurality of group rosters.

19. The device of claim 11, wherein the name view interactive icon and the group view interactive icon are from among a plurality of interactive icons including a new group interactive icon, and
wherein the display unit is further configured to transition to a new group roster screen upon a user selecting the new group interactive icon via the user interface to facilitate adding a new group roster to the plurality of group rosters.

20. The device of claim 19, wherein the new group roster screen includes a name profile field to facilitate the identification of the new group roster from among the plurality of group rosters via the user interface.

21. The device of claim 11, wherein the name view interactive icon and the group view interactive icon are from among a plurality of interactive icons including a sorting interactive icon, and wherein the display unit is further configured to (i) display the plurality of drivers sorted in alphabetical order when the sorting interactive icon is selected by a user via the user interface in the roster view, and (ii) display the plurality of groups rosters sorted in alphabetical order when the sorting interactive icon is selected by a user via the user interface in the group view.

\* \* \* \* \*